(12) United States Patent
Liu et al.

(10) Patent No.: US 7,557,232 B2
(45) Date of Patent: Jul. 7, 2009

(54) COMPOSITIONS USEFUL AS CHROMATOGRAPHY STATIONARY PHASES

(75) Inventors: Xiaodong Liu, Cupertino, CA (US); Christopher A. Pohl, Union City, CA (US); Jinhua Chen, San Jose, CA (US)

(73) Assignee: Dionex Corporation, Sunnyvale, CA (US)

(*) Notice: Subject to any disclaimer, the term of this patent is extended or adjusted under 35 U.S.C. 154(b) by 0 days.

(21) Appl. No.: 11/753,934

(22) Filed: May 25, 2007

(65) Prior Publication Data
US 2008/0293959 A1 Nov. 27, 2008

(51) Int. Cl.
C07F 7/02 (2006.01)
C07F 7/08 (2006.01)
C07F 7/18 (2006.01)

(52) U.S. Cl. .................. 556/449; 556/463; 556/465

(58) Field of Classification Search .................. 556/449, 556/463, 465
See application file for complete search history.

(56) References Cited

U.S. PATENT DOCUMENTS

| | | | |
|---|---|---|---|
| 3,660,454 A | 5/1972 | Gornowicz et al. | |
| 4,177,038 A | 12/1979 | Biebricher et al. | |
| 4,213,860 A | 7/1980 | Tsibris | |
| 4,322,310 A | 3/1982 | House | |
| 4,415,631 A | 11/1983 | Schutijser | |
| 4,431,546 A | 2/1984 | Hughes et al. | |
| 4,627,919 A | 12/1986 | Yuki | |
| 4,650,784 A | 3/1987 | Ramsden et al. | |
| 4,773,994 A | 9/1988 | Williams | |
| 4,778,600 A | 10/1988 | Williams | |
| 4,830,921 A | 5/1989 | Kitayama et al. | |
| 4,837,348 A | 6/1989 | Stolowitz et al. | |
| 4,883,598 A | 11/1989 | Riethorst et al. | |
| 4,985,144 A | 1/1991 | Quentin-Millet et al. | |
| 5,043,062 A | 8/1991 | Bale et al. | |
| 5,045,190 A | 9/1991 | Carbonell et al. | |
| 5,103,000 A | 4/1992 | Akiyama et al. | |
| 5,135,649 A | 8/1992 | Kanda et al. | |
| 5,137,627 A | 8/1992 | Feibush | |
| 5,149,426 A | 9/1992 | Watabe et al. | |
| 5,240,602 A | 8/1993 | Hammen | |
| 5,277,813 A | 1/1994 | Feibush et al. | |
| 5,318,848 A | 6/1994 | Itoh et al. | |
| 5,868,938 A | 2/1999 | Börner et al. | |
| 5,945,520 A | 8/1999 | Burton et al. | |
| 6,020,448 A | 2/2000 | Jenkner et al. | |
| 6,310,199 B1 | 10/2001 | Smith et al. | |
| 6,375,846 B1 | 4/2002 | Jarrett | |
| 6,645,378 B1 | 11/2003 | Liu et al. | |
| 6,949,186 B2 | 9/2005 | Liu et al. | |
| 7,074,491 B2 | 7/2006 | Liu et al. | |
| 7,402,243 B2 | 7/2008 | Liu et al. | |
| 2003/0215801 A1 | 11/2003 | Pieken et al. | |
| 2005/0178730 A1 | 8/2005 | Li | |
| 2006/0054559 A1 | 3/2006 | Liu et al. | |
| 2006/0180549 A1 | 8/2006 | Liu et al. | |

FOREIGN PATENT DOCUMENTS

| | | |
|---|---|---|
| DE | 2241014 A1 | 3/1973 |
| EP | 0885895 A2 | 5/1998 |
| EP | 0885895 A3 | 5/1998 |
| EP | 1110967 A1 | 6/2001 |
| EP | 1205177 A2 | 5/2002 |
| GB | 2074892 A | 11/1981 |
| JP | 56027648 A2 | 3/1981 |
| WO | WO 86/06072 A1 | 10/1986 |
| WO | WO 02/088222 A1 | 11/2002 |

OTHER PUBLICATIONS

Alpert, AJ. Hydrophilic-interaction chromatography for the separation of peptides, nucleic acids and other polar compounds, *J. Chromatogr.* 499:177-1196 (1990).
Neue, U. Normal-phase chromatography, HPLC Columns—Theory, Technology and Practice:164-182), Wiley-Vch, NY (1997).
Neue, U. Reversed-phase chromatography, HPLC Columns—Theory, Technology and Practice:183-203, Wiley-Vch, NY (1997).
Neue, U. Hydrophilic-interaction chromatography, HPLC Columns—Theory, Technology and Practice:217-223, Wiley-Vch, NY (1997).
Olsen,BA. Hydrophilic interaction chromatography using amino and silica columns for the determination of polar pharmaceuticals and impurities, *J. Chromatogr. A* 913:113-122 (2001).
SeQuant. Hydrophilic stationary phase for liquid chromatography, sequant.com (products) 1994.
Tanaka, H, X Zhou et al. Characterization of a novel diol column for high-performance liquid chromatography, *J. Chromatogr. A* 987:119-125 (2003).
Nimura, N., Hiroko, I., Kinoshita, T. Diol-bonded silica gel as a restricted access packing forming a binary-layered phase for direct injection of serum for the determination of drugs, *J. Chomatog. A* 689:203-210 (1995).

(Continued)

*Primary Examiner*—Elvis O Price
(74) *Attorney, Agent, or Firm*—Morgan Lewis & Bockius LLP; David J. Brezner; Ute Splittgerber

(57) ABSTRACT

The current invention provides compositions, which are useful as stationary phases for a variety of chromatographic applications, such as high performance liquid chromatography (HPLC). The compositions include a substrate (e.g., silica gel), covalently bound to a compound, which includes both a hydrophobic moiety and a hydrophilic moiety, which is preferably a 1,2-diol moiety. The hydrophobic moiety is sufficiently hydrophobic for the compositions to exhibit reversed phase characteristics and typically incorporates at least 5 carbon atoms in sequence. Based on having both hydrophilic and hydrophobic functionalities, the new stationary phases exhibit unique chromatographic properties. For example, these media can be used in either hydrophilic (HILIC) mode, in which the mobile phase includes a high percentage of an organic solvent, or in reversed phase mode, in which the mobile phase contains a higher percentage of an aqueous solvent. The current invention also provides methods of making and using the compounds and compositions of the invention.

31 Claims, 6 Drawing Sheets

OTHER PUBLICATIONS

Pesek, J.J., Matyska, M.T. Synthesis and spectrometric characterization of a true diol bonded phase, *J. Chromatog. A* 687:33-44 (1994).

Seibert, D.S., Poole, C.F., Abraham, M.H. Retention properties of a spacer-bonded propanediol sorbent for reversed-phase liquid chromatography and solid-phase extraction, *Analyst* 121:511-520 (Apr. 1996).

(Abstract of) Silicon-containing amides. IV. Reaction to sodium ethylecetamide with methyldialkoxychloromethylsilanes, Zhurnal Obshchei Khimii (USSR) 38(11):2582-2585 (1968).

Annis, D. et al. Polymer-supported chiral Co(salen) complexed, *J. Am. Chem. Soc.* 121(17):4147-4154 (1999).

Anon. Novel stationary phases, from SIELC website (last accessed Jun. 21, 2004), located at <http://allsep.com/Technology_NovelStationaryPhases.php>.

Berendsen, et al. Role of chain length of chemically bonded phased and the retention mechanis in reversed-phase liquid chromatography, J. Chromatog 196:21-37 (1980).

Bischoff, R. et al. Chemically synthesized hydrophobic anion-exchange high-performance liquid chromatography supports used for oligonucleotide resolution by mixed mode chromatography, J. Chromatogr. A 270:117-126 (1983).

Bischoff, R. Nucleic acid resolution by mixed-mode chromatography, J. Chromatogr. A 296:329-337 (1984).

(Abstract of) Calas, R. A trimethoxyslyloamine and a trimethoxysilyl ketone derived from 10-undecenoic acid, Rev. Frac. Corps Gras 3:5-9 (1956).

McDonald et al. Solid phase extraction applications: Guide and bibliography, a resource guide for sample preparation methods development, method development manual and comprehensive compendium of world wide Waters Sep-Pack cartridge Solid Phase Applications, p. 23, (1995).

O'Gara, J., et al. Embedded-polar-group bonded phases for high performance liquid chromatography, LC-GC 19(6):632-641 (Jun. 2001).

Oviatt, H. et al. Applications of organic bridged polysilsequioxane xerogels to nonlinear optical materials by the Sol-Gel method, *Chem. mat.* 7(3):493-498 (Mar. 1995).

Schmitt, T. Analysis of surfactants, 2d ed., pp. 197-292, Marcel Dekker, Inc., New York, NY (2001).

Snyder. Introduction to Modern Liquid Chromatography, pp. 272-275, John Wiley & Sons, New York, NY (1979).

Speier, J. et al. Synthesis of (3-aminoalkyl) silcon compounds, J. Org. Chem. 36(21):3120-3126 (1971.

COMPOSITIONS USEFUL AS CHROMATOGRAPHY STATIONARY PHASES

FIELD OF THE INVENTION

This invention relates to compositions, particularly ones useful as stationary phases for chromatographic applications and methods of making the compositions.

BACKGROUND OF THE INVENTION

The chromatographic separation of polar compounds is associated with a variety of difficulties. Reversed-phase (RP) columns are widely used for separating molecules via hydrophobic interaction. However, conventional alkyl-bonded reversed-phase media (e.g., C18 and C8) are often not suitable for retaining or separating highly polar molecules (Neue, "HPLC Columns—Theory, Technology, and Practice", WILEY-VCH, New York, 1997, 183-203). Likewise, ion-pairing chromatography is often problematic because of long equilibration times and incompatibility with mass spectroscopy (MS).

Normal-phase chromatography can also be used to separate polar molecules. A wide range of solvents can be utilized to adjust the selectivity of a particular separation (Neue, "HPLC Columns—Theory, Technology, and Practice," WILEY-VCH, New York, 1997, 164-182). However, due to the sensitivity of normal-phase media to the presence of small concentrations of polar contaminants in the mobile phase, lengthy equilibrating times are common and/or reproducibility problems may occur. Moreover, normal-phase chromatography is often inapplicable due to poor solubility of highly polar compounds in organic solvents.

HILIC (HydrophILic Interaction Chromatography or Hydrophilic Interaction LIquid Chromatography) is a form of normal phase liquid chromatography. HILIC fills the gap between reversed-phase and normal phase chromatography. Appropriate HILIC phases can retain polar compounds while using organic mobile phases, which incorporate only a small percentage of water or an aqueous buffer, typically between about 5 and 30% (Neue, "HPLC Columns—Theory, Technology, and Practice," WILEY-VCH, New York, 1997, 217-223).

In HILIC, retention increases with the polarity of the analyte and decreases with the polarity of the mobile phase. One possible retention mechanism of HILIC is the partitioning of the analytes between a water-rich stationary phase and a water-poor mobile phase (A. J. Alpert, *J. Chromatogr.* 1990, 499, 117-196). Additional benefits of HILIC include complementary selectivity to reversed-phase columns, enhanced sensitivity in mass spectrometry, and simplified sample preparation procedures. Consequently, HILIC provides a mechanism for the separation and analysis of a wide range of analytes, such as carbohydrates, amino acids, peptides, oligonucleotides and phospholipids, but also small-molecule drugs and their metabolites.

In general, the packing materials for normal phase chromatography and HILIC can be grouped into the following five categories:

(1) Simple, unbonded silica (see e.g., B. A. Olsen, *J. Chromatogr.* 2001, A 913, 113-122);

(2) Neutral silica-based packings bearing diol groups (H. Tanaka, X. Zhou, and O. Masayoshi, *J. Chromatogr.* 2003, A 987, 119-125);

(3) Silica-based packings with amide functionality (A. J. Alpert, *J. Chromatogr.* 1990, 499, 117-196);

(4) Silica-based packings bearing anion-exchange or cation-exchange functionalities (Neue, "HPLC Columns—Theory, Technology, and Practice," WILEY-VCH, New York, 1997, 217-223); and (5) Zwitterionic silica-based packings, such as those currently offered by Sequant.

Unbonded silica was one of the first and most extensively used chromatographic packing material because it was readily available. As discussed above, this material has several drawbacks including poor reproducibility and long equilibration times as well as a limited operating pH range. To overcome these difficulties, silica gels covalently modified with a diol moiety (diol phase) were developed. In these diol phases, silanol groups are functionalized with hydroxyalkyl groups. The resulting stationary phases offer improved reproducibility, shorter equilibration times and a wider operating pH range. In addition, diol-phases are often characterized by reduced secondary interaction compared to its ionizable counterparts.

However, these and other conventional HILIC materials have inadequate hydrophobicity, making them unsuitable for separating molecules under RP conditions. Therefore, it is highly desirable to develop stationary phases that combine both HILIC and RP characteristics. The present invention addresses these and other needs.

SUMMARY OF THE INVENTION

The current invention provides compositions, which are useful as packing materials/stationary phases for a variety of chromatographic applications, such as high performance liquid chromatography (HPLC). The compositions include a substrate (e.g., silica gel), covalently bound to a molecule, which includes both a hydrophobic moiety as well as a hydrophilic moiety. The hydrophilic moiety is preferably found at a significant distance from the surface of the substrate (e.g., at least 5 carbon atoms away). Based on having both hydrophilic and hydrophobic functionalities, the new packing materials exhibit unique chromatographic properties. For example, these media can be used in either HILIC mode, in which the mobile phase includes a high percentage of an organic solvent, or in RP mode, in which the mobile phase contains a considerable amount of an aqueous solvent. As a result, the new stationary phases are useful for many applications, including the analysis of molecules, which themselves include hydrophilic and hydrophobic moieties, such as ethoxylated surfactants.

In a first aspect, the present invention provides a composition comprising a compound covalently bound to a substrate. The compound has a structure according to Formula (I), in which the integer n is selected from 0 and 1:

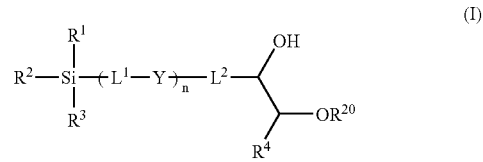

In Formula (I), at least one of $R^1$, $R^2$ and $R^3$ is covalently bound to the substrate. $R^1$, $R^2$ and $R^3$ are members independently selected from halogen, $OR^{10}$, $NR^{10}R^{11}$, $OC(O)R^{12}$, $OS(O)_2R^{12}$, substituted or unsubstituted alkyl substituted or unsubstituted heteroalkyl, substituted or unsubstituted aryl, substituted or unsubstituted heteroaryl, substituted or unsubstituted heterocycloalkyl and a bond to said substrate. Each $R^{10}$ and each $R^{11}$ is a member independently selected from H, substituted or unsubstituted alkyl, substituted or unsubstituted heteroalkyl, substituted or unsubstituted aryl, substituted or unsubstituted heteroaryl, substituted or unsubstituted heterocycloalkyl and a bond to the substrate. Each $R^{12}$ is a member independently selected from substituted or unsubstituted alkyl (e.g., $CH_3$, $CF_3$), substituted or unsubstituted heteroalkyl, substituted or unsubstituted aryl, substituted or unsubstituted heteroaryl and substituted or unsubstituted heterocycloalkyl.

In Formula (I), $L^1$ and $L^2$ are linker groups independently selected from substituted or unsubstituted alkyl, substituted or unsubstituted heteroalkyl, substituted or unsubstituted aryl, substituted or unsubstituted heteroaryl and substituted or unsubstituted heterocycloalkyl. In those cases, in which n is 1 and Y is present, at least one of $L^1$ and $L^2$ preferably includes a carbon chain having at least 5 carbon atoms, at least 6 carbon atoms, at least 7 carbon atoms or at least 8 carbon atoms in sequence. In those cases, in which n is 0, $L^2$ preferably includes a carbon chain having at least 5 carbon atoms, at least 6 carbon atoms, at least 7 carbon atoms or at least 8 carbon atoms in sequence. At least two of the carbon atoms in sequence (in $L^1$, $L^2$ or both $L^1$ and $L^2$) are optionally part of a 5- or 6-membered ring, wherein the ring is a member selected from aryl (e.g., phenyl), heteroaryl (e.g., thiophene) and cycloalkyl (e.g., cyclohexyl or cyclopentyl). The ring can optionally be substituted with a non-polar substituent, such as a $C_1$-$C_4$ alkyl group (e.g., methyl).

The two linker groups $L^1$ and $L^2$ are connected through the group Y, which is a member selected from an ether or thioether bond, an amide, sulfonamide, carbonate or carbamate group and a urea or thiourea group. The amide, sulfonamide, carbamate, urea or thiourea groups are optionally substituted. In a particularly preferred embodiment, Y is an amide group, wherein the nitrogen atom is optionally substituted with a lower alkyl group, such as a methyl group.

$R^4$ is a member selected from H, acyl, substituted or unsubstituted $C_1$-$C_4$ alkyl, substituted or unsubstituted $C_1$-$C_4$ heteroalkyl, wherein $R^4$ and a substituent of $L^2$, together with the atoms to which they are attached, are optionally joined to form a 3- to 7-membered ring. In one example, the ring is a substituted or unsubstituted cyclohexyl or cyclopentyl ring. $R^{20}$ is a member selected from H, substituted alkyl, substituted heteroalkyl and substituted heterocycloalkyl, provided that at least one substituent of $R^{20}$ is OH. In one embodiment, $R^{20}$ includes a polyether moiety.

In a second aspect the invention provides a compound having a structure according to Formula (VI), in which n is an integer selected from 0 and 1. In an exemplary embodiment, the compounds of Formula (VI) are useful as reagents/precursors in the synthesis of the compositions of the invention:

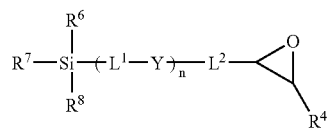

In Formula (VI), $R^6$, $R^7$ and $R^8$ are members independently selected from halogen, $OR^{14}$, $NR^{14}R^{15}$, $OC(O)R^{16}$, $OS(O)_2R^{16}$, substituted or unsubstituted alkyl, substituted or unsubstituted heteroalkyl, substituted or unsubstituted aryl, substituted or unsubstituted heteroaryl and substituted or unsubstituted heterocycloalkyl. At least one of $R^6$, $R^7$ and $R^8$ is an active silyl group substituent, such as an alkoxy group, a halogen or a primary or secondary amino group. Each $R^{14}$ and each $R^{15}$ is a member independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl. Each $R^{16}$ is a member independently selected from substituted (e.g, halogen substituted, e.g., $CF_3$) or unsubstituted alkyl (e.g., $CH_3$), substituted or unsubstituted heteroalkyl, substituted or unsubstituted aryl, substituted or unsubstituted heteroaryl and substituted or unsubstituted heterocycloalkyl.

In Formula (VI), $L^1$, $L^2$, $R^4$, $R^{20}$ and Y are defined as above for Formula (I).

In a third aspect the invention provides a method of making a composition of the invention. The method includes: (i) contacting a substrate (e.g., silica gel) having a reactive functional group (e.g., a silanol group) with a compound having an epoxide moiety and having a structure according to Formula (VI):

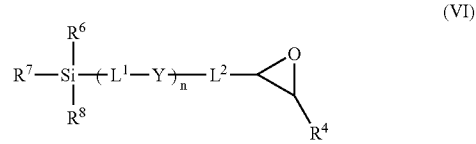

wherein n, $R^6$, $R^7$, $R^8$, $L^1$, $L^2$, $R^4$ and Y are defined as above for Formula (VI), under conditions sufficient to form a covalent bond between the compound and the substrate through reaction between the reactive functional group of the substrate and at least one of $R^6$, $R^7$ and $R^8$. The method may further include (ii) converting the epoxide moiety into an 1,2-diol moiety, for example, by acid-catalyzed hydrolysis or by opening of the epoxide ring using a nucleophilic reagent. In a preferred embodiment, at least one of $R^6$, $R^7$ and $R^8$ is halogen or alkoxy (e.g., methoxy or ethoxy).

DETAILED DESCRIPTION OF THE INVENTION

I. Definitions

Figure 1:
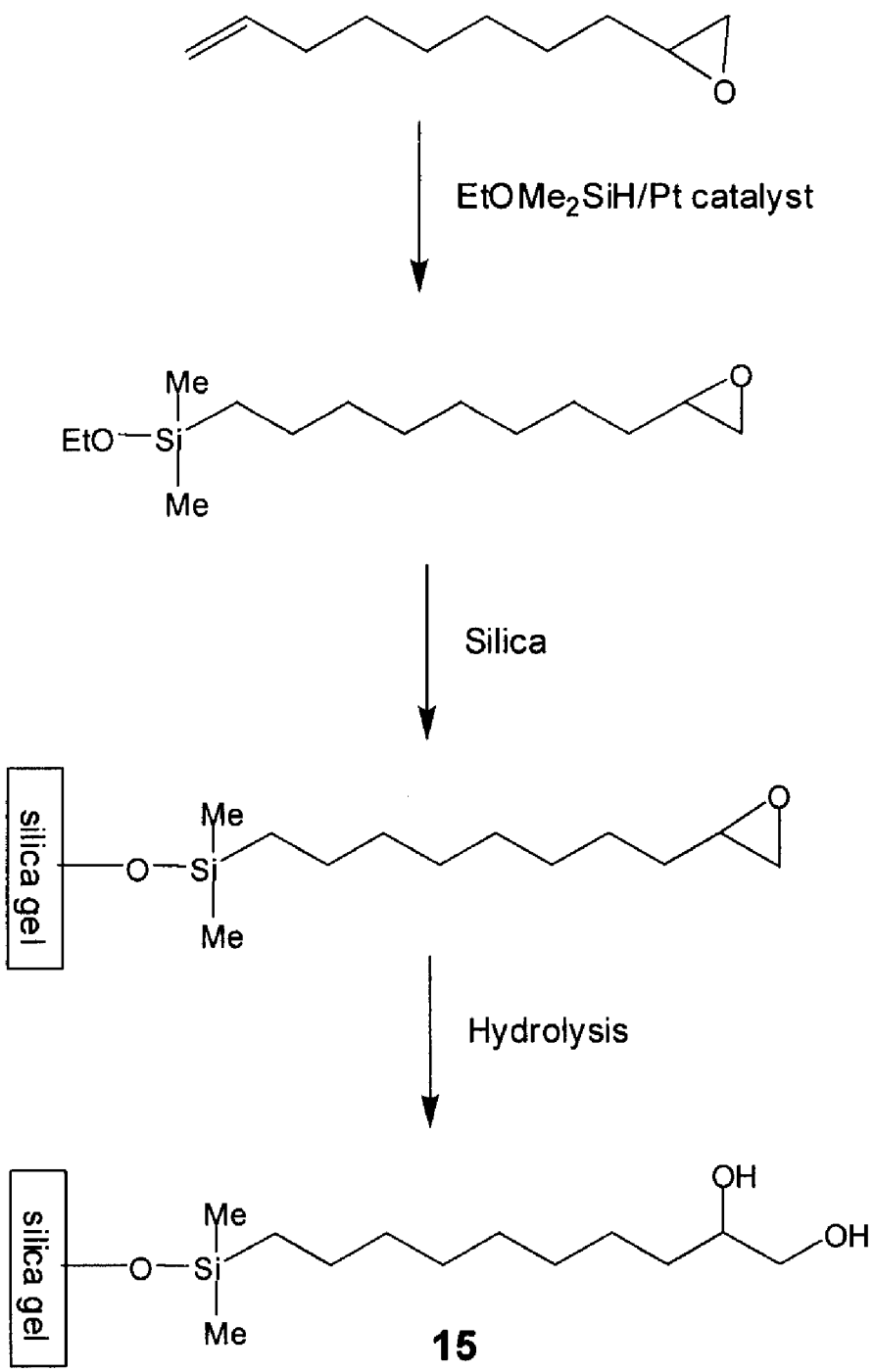
FIG. 1 is a synthetic scheme showing the preparation of diol phase 15.

Where substituent groups are specified by their conventional chemical formulae, written from left to right, they equally encompass the chemically identical substituents, which would result from writing the structure from right to left, e.g., —CH$_2$O— is intended to also recite —OCH$_2$—.

The term "alkyl," by itself or as part of another substituent, means, unless otherwise stated, a straight or branched chain, or cyclic hydrocarbon radical, or combination thereof, which may be fully saturated, mono- or polyunsaturated and can include di- and multivalent radicals, having the number of carbon atoms designated (i.e. C$_1$-C$_{10}$ means one to ten carbons). Examples of saturated hydrocarbon radicals include, but are not limited to, groups such as methyl, ethyl, n-propyl (e.g., —CH$_2$—CH$_2$—CH$_3$, —CH$_2$—CH$_2$—CH$_2$—), isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl." Alkyl groups that are limited to hydrocarbon groups are termed "homoalkyl". The term "alkyl" can also mean "alkylene" or "alkyldiyl" as well as alkylidene in those cases where the alkyl group is a divalent radical.

The term "alkylene" or "alkyldiyl" by itself or as part of another substituent means a divalent radical derived from an alkyl group, as exemplified, but not limited, by —CH$_2$CH$_2$CH$_2$— (propylene or propane-1,3-diyl), and further includes those groups described below as "heteroalkylene." Typically, an alkyl (or alkylene) group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl", "lower alkylene" or "lower alkyldiyl" is a shorter chain alkyl, alkylene or alkyldiyl group, generally having about 10 or fewer carbon atoms, about 8 or fewer carbon atoms, about 6 or fewer carbon atoms or about 4 or fewer carbon atoms.

The term "alkylidene" by itself or as part of another substituent means a divalent radical derived from an alkyl group, as exemplified, but not limited, by CH$_3$CH$_2$CH$_2$=(propylidene). Typically, an alkylidene group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl" or "lower alkylidene" is a shorter chain alkyl or alkylidene group, generally having about 10 or fewer carbon atoms, about 8 or fewer carbon atoms, about 6 or fewer carbon atoms or about 4 or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si, S and B, and wherein the nitrogen and sulfur atoms may optionally be oxidized and the nitrogen heteroatom may optionally be quaternized. The heteroatom(s) O, N, B, S and Si may be placed at any interior position of the heteroalkyl group or at the position at which the alkyl group is attached to the remainder of the molecule. Examples include, but are not limited to, —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_2$, —S(O)—CH$_3$, —CH$_2$—CH$_2$—S(O)$_2$—CH$_3$, —CH=CH—O—CH$_3$, —Si(CH$_3$)$_3$, —CH$_2$—CH=N—OCH$_3$, and —CH=CH—N(CH$_3$)—CH$_3$. Up to two heteroatoms may be consecutive, such as, for example, —CH$_2$—NH—OCH$_3$ and —CH$_2$—O—Si(CH$_3$)$_3$. Similarly, the term "heteroalkylene" by itself or as part of another substituent means a divalent radical derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —CO$_2$R'— represents both —C(O)OR' and —OC(O)R'.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo(C$_1$-C$_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl groups (or rings) that contain from one to four heteroatoms selected from N, O, S, Si and B, wherein the nitrogen and sulfur atoms are optionally oxidized, and the nitrogen atom(s) are optionally quaternized. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl" and "heteroaryl") are meant to include both substituted and unsubstituted forms of the indicated radical. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R''', —OC(O)R', —C(O)R', —CO$_2$R', —CONR'R", —OC(O)NR'R", —NR"C(O)R', —NR'—C(O) NR"R''', —NR"C(O)$_2$R', —NR—C(NR'R"OR''')=NR'''', —NR—C(NR'R")=NR''', —S(O)R', —S(O)$_2$R', —OS(O)$_2$R', —S(O)$_2$NR'R", —NRSO$_2$R', —CN and —NO$_2$ in a number ranging from zero to (2m'+1), where m' is the total number of carbon atoms in such radical. R', R", R''' and R'''' each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R''' and R'''' groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

Similar to the substituents described for the alkyl radical, substituents for the aryl and heteroaryl groups are generically referred to as "aryl group substituents." The substituents are selected from, for example: substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"OR''', —OC(O)R', —C(O)R', —CO$_2$R', —CONR'R", —OC(O)NR'R", —NR"C(O)R', —NR'—C(O) NR"R''', —NR"C(O)$_2$R', —NR—C(NR'R"OR''')=NR" ", —NR—C(NR'R")=NR''', —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxy, and fluoro(C$_1$-C$_4$)alkyl, in a number ranging from zero to the total number of open valences on the aromatic ring system; and where R', R", R''' and R'''' are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R''' and R'''' groups when more than one of these groups is present.

Two of the substituents on adjacent atoms of the aryl or heteroaryl ring may optionally be replaced with a substituent of the formula —T—C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula —A—(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —(CRR')$_s$—X—(CR"R''')$_d$—, where s and d are independently integers of from 0 to 3, and X is –O—, —NR'—, —S—, —S(O)—, —S(O)$_2$—, or —S(O)$_2$NR'—. The substituents R, R', R" and R''' are preferably independently selected from hydrogen or substituted or unsubstituted (C$_1$-C$_6$)alkyl.

As used herein, the term "silyl group substituent" can be one or more of a variety of groups selected from, but not limited to: substituted or unsubstituted alkyl, substituted or unsubstituted heteroalkyl, substituted or unsubstituted aryl, substituted or unsubstituted heteroaryl, substituted or unsubstituted heterocycloalkyl, acyl, —OR', —NR'R", —SR', -halogen, —SiR'R"OR''', —OC(O)R', —C(O)R', —CO$_2$R', —CONR'R", —OC(O)NR'R", —NR"C(O)R', —NR'—C(O) NR"R''', —NR"C(O)$_2$R', —NR—C(NR'R"OR''')=NR'''', —NR—C(NR'R")=NR''', —S(O)R', —S(O)$_2$R', —OS(O)$_2$R', —S(O)$_2$NR'R", —NRSO$_2$R', —CN and —NO$_2$. R', R", R''' and R'''' each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R''' and R'''' groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

As used herein, the term "non-reactive silyl group substituent" means a "silyl group substituent" that does not react with a substrate of the invention to form a covalent bond between the silyl group substituent and the substrate. Exemplary "non-reactive silyl group substituents" include alkyl (e.g., methyl, ethyl, propyl, butyl and other lower alkyl groups) or aryl groups (e.g., phenyl and thiophenyl).

As used herein, the term "reactive silyl group substituent" means a "silyl group substituent" that is capable of reacting with a substrate of the invention to form a covalent bond between the silyl group substituent and the substrate. Exemplary "reactive silyl group substituents" include those groups that are conventionally defined as leaving groups, such as halogens (e.g., Cl and Br). Other exemplary "reactive silyl group substituents" include alkoxy groups (e.g., methoxy or ethoxy) and primary and secondary amino groups.

As used herein, the term "acyl" describes a substituent containing a carbonyl residue, C(O)R. Exemplary species for R include H, halogen, substituted or unsubstituted alkyl, substituted or unsubstituted hetroalkyl, substituted or unsubstituted aryl, substituted or unsubstituted heteroaryl, and substituted or unsubstituted heterocycloalkyl.

As used herein, the term "fused ring system" means at least two rings, wherein each ring has at least 2 atoms in common with another ring. "Fused ring systems may include aromatic as well as non aromatic rings. Examples of "fused ring systems" are naphthalenes, indoles, quinolines, chromenes and the like.

As used herein, the term "heteroatom" includes oxygen (O), nitrogen (N), sulfur (S), silicon (Si) and boron (B).

The symbol "R" is a general abbreviation that represents a substituent group that is selected from substituted or unsubstituted alkyl, substituted or unsubstituted heteroalkyl, substituted or unsubstituted aryl, substituted or unsubstituted heteroaryl, and substituted or unsubstituted heterocycloalkyl groups.

When compounds of the present invention contain relatively basic or acidic functionalities, salts of such compounds are included in the scope of the invention. Salts can be obtained by contacting the neutral form of such compounds with a sufficient amount of the desired acid or base, either neat or in a suitable inert solvent. Examples of salts for relative acidic compounds of the invention include sodium, potassium, calcium, ammonium, organic amino, or magnesium salts, or a similar salts. When compounds of the present invention contain relatively basic functionalities, acid addition salts can be obtained by contacting the neutral form of such compounds with a sufficient amount of the desired acid, either neat or in a suitable inert solvent. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids and the like, as well as the salts derived from organic acids like acetic, propionic, isobutyric, maleic, malonic, benzoic, succinic, suberic, fumaric, lactic, mandelic, phthalic, benzenesulfonic, p-tolylsulfonic, citric, tartaric, methanesulfonic, and the like. Also included are salts of amino acids such as arginate and the like, and salts of organic acids like glucuronic or galactunoric acids and the like (see, for example, Berge et al., *Journal of Pharmaceutical Science* 1977, 66: 1-19). Certain specific compounds of the present invention contain both basic and acidic functionalities that allow the compounds to be converted into either base or acid addition salts.

When a residue is defined as "O⁻" (COO⁻), then the formula is meant to optionally include H or a cationic counterion. Preferably, the salt form of the compound is pharmaceutically acceptable.

The neutral forms of the compounds are preferably regenerated by contacting the salt with a base or acid and isolating the parent compound in the conventional manner. The parent form of the compound differs from the various salt forms in certain physical properties, such as solubility in polar solvents, but otherwise the salts are equivalent to the parent form of the compound for the purposes of the present invention.

Certain compounds of the present invention can exist in unsolvated forms as well as solvated forms, including hydrated forms. In general, the solvated forms are equivalent to unsolvated forms and are encompassed within the scope of the present invention. Certain compounds of the present invention may exist in multiple crystalline or amorphous forms. In general, all physical forms are equivalent for the uses contemplated by the present invention and are intended to be within the scope of the present invention. "Compound or a pharmaceutically acceptable salt or solvate of a compound" intends the inclusive meaning of "or", in that a material that is both a salt and a solvate is encompassed.

Certain compounds of the present invention possess asymmetric carbon atoms (optical centers) or double bonds; the racemates, diastereomers, geometric isomers and individual isomers are encompassed within the scope of the present invention. Optically active (R)- and (S)-isomers may be prepared using chiral synthons or chiral reagents, or resolved using conventional techniques. When the compounds described herein contain olefinic double bonds or other centers of geometric asymmetry, and unless specified otherwise, it is intended that the compounds include both E and Z geometric isomers. Likewise, all tautomeric forms are also intended to be included.

The graphic representations of racemic, ambiscalemic and scalemic or enantiomerically pure compounds used herein are taken from Maehr, *J. Chem. Ed.*, 62: 114-120 (1985): solid and broken wedges are used to denote the absolute configuration of a chiral element; wavy lines indicate disavowal of any stereochemical implication which the bond it represents could generate; solid and broken bold lines are geometric descriptors indicating the relative configuration shown but not implying any absolute stereochemistry; and wedge outlines and dotted or broken lines denote enantiomerically pure compounds of indeterminate absolute configuration.

The terms "enantiomeric excess" and diastereomeric excess" are used interchangeably herein. Compounds with a single stereocenter are referred to as being present in "enantiomeric excess," those with at least two stereocenters are referred to as being present in "diastereomeric excess."

The compounds of the present invention may also contain unnatural proportions of atomic isotopes at one or more of the atoms that constitute such compounds. For example, the compounds may be radiolabeled with radioactive isotopes, such as for example tritium ($^3H$), iodine-125 ($^{125}I$) or carbon-14 ($^{14}C$). All isotopic variations of the compounds of the present invention, whether radioactive or not, are intended to be encompassed within the scope of the present invention.

II. Introduction

The current invention relates to compositions including a compound covalently bound to a substrate, wherein the compound contains at least one hydrophobic linker as well as a polar head group, such as a 1,2-diol moiety. The compositions of the invention are useful as stationary phases or packing materials in the field of chromatography, such as high performance liquid chromatography (HPLC). In a preferred embodiment, the compositions are useful for the chromatographic separation of both polar (hydrophilic) and non-polar (hydrophobic) molecules. The optimal balance between the hydrophilic and the hydrophobic moieties of the substrate-bonded compounds creates unique chromatographic properties for the new packing materials, which are useful for a variety of applications including the analysis of surfactants (e.g., hydrophobe distribution of ethoxylated nonionic surfactants). In addition, this invention relates to the synthesis of new silanes incorporating an epoxy group as well as methods for their immobilization on a substrate, such as silica gel.

In a preferred embodiment, the new packing materials can be used in either HILIC mode, in which the mobile phase has a high concentration of an organic solvent, or in reverse phase (RP) mode, in which the mobile phase includes an aqueous solvent. As stationary phases/packing materials for chromatography, the compositions of the invention offer many advantages, which include:

1. The new materials are capable of retaining highly polar molecules, which are not retained by conventional reversed-phase chromatography.

2. The selectivity of the new packing material is complementary to reversed-phase columns.

3. Compared to unbonded silica (i.e., normal phase columns), the new phases are characterized by faster equilibration times and better reproducibility.

4. Compared to conventional diol-phases with a three-carbon linkage, the new phases are characterized by improved hydrophobicity and chemical stability.

5. The new materials can be used with mobile phases including a high content (e.g., greater than 80%) of an organic solvent and therefore provide enhanced sensitivity in mass spectrometry (e.g., enhanced ESI-MS response).

6. The new materials can be used in both reversed-phase and normal phase modes.

7. The new materials can be used to analyze molecules, which are difficult to analyze using conventional chromatographic media. For example, compounds, which can be analyzed efficiently, include nonionic ethoxylated surfactants and other highly polar molecules (e.g., ureas) as well as peptides and lipids.

III. Compositions

Stationary Phases

The current invention provides compositions, which are useful as stationary phases or packing materials for a variety of chromatographic applications. Alternatively, the compositions of the invention may be used in other products useful for separation, detection and analysis of compounds, such as membranes, filters and microfluidic devices.

The compositions include a substrate (e.g., silica gel) and a compound, which is covalently bound to the substrate via a silyl group. The compound includes at least one hydrophobic linker as well as a polar head group. The compositions of the invention can generally be described by the following structure, wherein n is either 0 or 1:

wherein the compound has a structure according to Formula (I), in which n is an integer selected from 0 and 1:

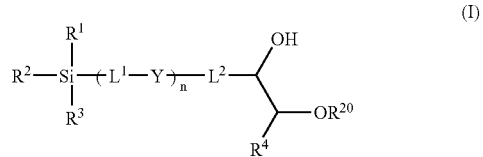

(I)

Silyl Group Substituents

In Formula (I), $R^1$, $R^2$ and $R^3$ are silyl group substituents. At least one of $R^1$, $R^2$ and $R^3$ is covalently bound to a substrate of the invention. In an exemplary embodiment, one of $R^1$, $R^2$ and $R^3$ is covalently bound to the substrate. In another exemplary embodiment, two of $R^1$, $R^2$ and $R^3$ are covalently bound to the substrate. In yet another exemplary embodiment, each of $R^1$, $R^2$ and $R^3$ is covalently bound to the substrate.

In one example, $R^1$, $R^2$ and $R^3$ are members independently selected from halogen, $OR^{10}$, $NR^{10}R^{11}$, acyl, $OC(O)R^{12}$, $OS(O)_2R^{12}$, substituted or unsubstituted alkyl, substituted or unsubstituted heteroalkyl, substituted or unsubstituted aryl, substituted or unsubstituted heteroaryl and substituted or unsubstituted heterocycloalkyl, wherein each $R^{10}$ and each $R^{11}$ is a member independently selected from H, substituted or unsubstituted alkyl, substituted or unsubstituted heteroalkyl, substituted or unsubstituted aryl, substituted or unsubstituted heteroaryl, substituted or unsubstituted heterocycloalkyl and a bond to a substrate of the invention (e.g., silica gel). Each $R^{12}$ is a member independently selected from substituted or unsubstituted alkyl, substituted or unsubstituted heteroalkyl, substituted or unsubstituted aryl, substituted or unsubstituted heteroaryl, substituted or unsubstituted heterocycloalkyl.

In another example, at least one of $R^1$, $R^2$ and $R^3$ is a non-reactive silyl group substituent. In this context, a "non-reactive silyl group substituent" does not react with the substrate to form a covalent bond between the silyl group substituent and the substrate. Exemplary non-reactive silyl group substituents include alkyl groups or aryl groups. In a preferred embodiment, at least one of $R^1$, $R^2$ and $R^3$ is a member selected from substituted or unsubstituted $C_1$-$C_6$ alkyl (e.g., methyl, ethyl, n-propyl, iso-propyl, n-butyl, iso-butyl and the like). In yet another example, two of $R^1$, $R^2$ and $R^3$ are non-reactive silyl group substituents. For example, two of $R^1$, $R^2$ and $R^3$ are members independently selected from substituted or unsubstituted alkyl, such as substituted or unsubstituted

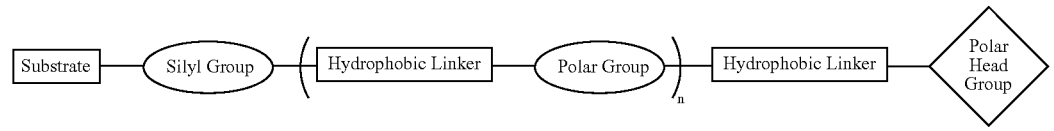

In one embodiment, the polar head group is a diol moiety. Thus, in a first aspect, the invention provides a composition that includes a compound covalently bound to a substrate, $C_1$-$C_6$ alkyl (e.g., methyl, ethyl, n-propyl, iso-propyl, n-butyl, iso-butyl and the like). In a particularly preferred embodiment, one or two of $R^1$, $R^2$ and $R^3$ are methyl.

Linker

In Formula (I), $L^1$ and $L^2$ in Formula (I) are linker groups, which in one embodiment, are independently selected from substituted or unsubstituted alkyl, substituted or unsubstituted heteroalkyl, substituted or unsubstituted aryl, substituted or unsubstituted heteroaryl and substituted or unsubstituted heterocycloalkyl.

In a preferred embodiment, the compounds of the invention include at least one hydrophobic linker. When n is 1, at least one of $L^1$ and $L^2$ in Formula (I) includes a hydrophobic moiety. When n is 0, $L^2$ includes a hydrophobic moiety. In this context, a "hydrophobic moiety" includes a carbon chain having a preferred number of carbon atoms in sequence, wherein this number is defined by a lower and an upper limit. With respect to the lower limit the hydrophobic moiety has preferably at least 5, at least 6, at least 7, at least 8, at least 9, at least 10, at least 11, or at least 12 carbon atoms in sequence. In a particularly preferred embodiment, the hydrophobic moiety has at least 7 carbon atoms in sequence. With respect to the higher limit, the hydrophobic moiety includes preferably not more than about 50 carbon atoms in sequence, not more than about 30 carbon atoms, not more than about 25 carbon atoms, not more than about 20 carbon atoms, or not more than about 15 carbon atoms in sequence. Exemplary ranges for the number of carbon atoms in sequence may be formed between the above described higher and lower limits. In yet another embodiment, the hydrophobic moiety includes more than 50 carbon atoms in sequence.

Within the hydrophobic moiety, at least two of the carbon atoms in sequence are optionally part of a ring (e.g., a 5- or 6-membered ring), wherein the ring is a member selected from aryl, heteroaryl, cycloalkyl and a fused ring system that can include aryl, heteroaryl and cycloalkyl rings. The ring is optionally substituted with a non-polar (hydrophobic) substituent, such as an unsubstituted alkyl group (e.g., methyl, ethyl or propyl group). In a preferred embodiment, the hydrophobic moiety is sufficiently hydrophobic for the compositions to exhibit reversed phase characteristics.

Polar Group Y

When in Formula (I) n is 1, then the compound of the invention includes a polar group Y. This group can be any suitable group useful to connect the two linker groups $L^1$ and $L^2$. In one embodiment, $L^1$ and $L^2$ are connected through an ether bond, a thioether bond, an amide or sulfonamide group or, alternatively, through a carbonate, carbamate, urea or thiourea group. In a particularly preferred embodiment, Y is an amide group: —C(O)NR$^{13}$— or NR$^{13}$C(O)—, wherein R$^{13}$ is a member selected from H, substituted or unsubstituted alkyl, substituted or unsubstituted heteroalkyl, substituted or unsubstituted aryl, substituted or unsubstituted heteroaryl and substituted or unsubstituted heterocycloalkyl. In a preferred embodiment, R$^{13}$ is hydrogen or lower alkyl, such as methyl.

Polar Head Group

The polar head group can be any moiety that includes at least one, preferably two hydroxyl groups. In one embodiment, the polar head group is a substituted or unsubstituted 1,2-diol moiety as shown in Figure (I), supra. R$^4$ is an alkyl group substituent. In one example, R$^4$ is a member selected from H, acyl, substituted or unsubstituted alkyl (e.g., $C_1$-$C_4$ alkyl) and substituted or unsubstituted heteroalkyl (e.g., $C_1$-$C_4$ heteroalkyl). In a preferred embodiment, R$^4$ is H. An exemplary structure according to this embodiment is shown below:

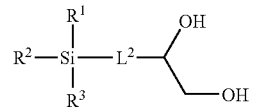

In another preferred embodiment, R$^4$ and a substituent of $L^2$, together with the atoms to which they are attached, are optionally joined to form a 3- to 7-membered ring selected from substituted or unsubstituted cycloalkyl and substituted or unsubstituted heterocycloalkyl. The ring is preferably cycloalkyl and is optionally substituted with a non-polar (hydrophobic) substituent, such as an unsubstituted alkyl group (e.g., methyl, ethyl or propyl group). An exemplary structure according to this embodiment is shown below:

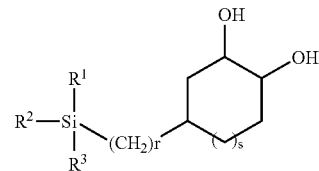

wherein s is an integer selected from 0 and 1; and r is an integer selected from 2 to 30, preferably from 2 to 20, more preferably from 2 to 10 and most preferably from 2 to 6.

In Formula (I), R$^{20}$ is member selected from H, substituted alkyl, substituted heteroalkyl and substituted heterocycloalkyl, provided that at least one substituent of R$^{20}$ is OH. In one embodiment, R$^{20}$ is a moiety, which is derived from the nucleophilic opening of an epoxide ring using a nucleophilic reagent having a nucleophilic oxygen. In one example, R$^{20}$ includes a polyether moiety. In another example, R$^{20}$ is H.

Substrate

The substrate of the invention can be any material (e.g., particles) useful as a stationary phase/packing material for chromatography including porous and non-porous solids.

Exemplary substrates include silica-based (e.g., silicon oxide), titanium-based (e.g., titanium oxide), germanium-based (e.g., germanium oxide), zirkonium-based (e.g., zirkonium oxide) and aluminum-based (e.g., aluminum oxide) materials. Other substrates include cross-linked and non-crosslinked polymers, carbonized materials and metals. Compounds of the invention can also be incorporated into polymeric networks, sol-gel networks or hybrid forms thereof. In one embodiment, the substrate is a silica-based substrate. Exemplary silica-based substrates include silica gel, glass, sol-gels, polymer/sol-gel hybrids and silica monolithic materials.

In one example, the substrate includes reactive functional groups, which can be reacted with an activated silyl group of a compound of the invention, e.g., those of Formula (VIa) and (VIb), to form a covalent bond between the substrate and the compound. Reactive functional groups of the substrate include silanol groups as well as alkoxy silane, halosilane and aminosilane moieties. Other exemplary reactive groups include metal-hydroxides, such as titanium hydroxide and zirconium hydroxide.

In a particularly preferred embodiment, the substrate is silica gel. Suitable silica gels include non-porous and/or porous silica particles of different pore sizes, preferably from 20 Å to 3000 Å and more preferably, from 60 Å to 2000 Å; and of different particle sizes, preferably, from 0.2 um to 1000 um, and more preferably, from 2 um to 50 um.

Exemplary Compositions of the Invention

In one embodiment, the integer n in Formula (I) is 0 and the linker $L^2$ includes an aromatic ring, such as a phenyl ring. In one example according to this embodiment, the compound has a structure according to Formula (II):

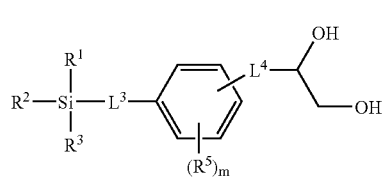

(II)

wherein m is an integer selected from 0 to 4. $L^3$ is a linker group, which is a member selected from substituted or unsubstituted alkyl. In one example, $L^3$ is straight or branched alkyl (e.g., $C_2$-$C_{20}$ alkyl). $L^4$ is a linker group, which is a member selected from a single bond, substituted or unsubstituted alkyl and substituted or unsubstituted heteroalkyl. In one example, $L^4$ is straight or branched alkyl optionally interrupted by one or more ether or thioether group.

Each R is an aryl group substituent. In an exemplary embodiment, each $R^5$ is a member independently selected from H, substituted or unsubstituted alkyl and substituted or unsubstituted heteroalkyl, wherein two adjacent $R^5$, together with the atoms to which they are attached, are optionally joined to form a 5- to 7-membered ring, wherein the ring can be aromatic or non-aromatic. In one embodiment, the ring is a phenyl ring, thus forming a naphthyl moiety. In a particularly preferred embodiment, each $R^5$ is a member independently selected from H and a non-polar substituent, such as unsubstituted alkyl. In one example, each $R^5$ is a member independently selected from H and unsubstituted $C_1$-$C_4$ alkyl (e.g., methyl, or ethyl).

In another exemplary embodiment, the compound of Formula (II) has a structure according to Formula (III):

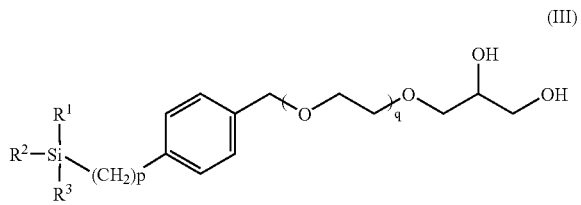

(III)

In Formula (III) p is an integer selected from 2 to 20, preferably from 2-15 and more preferably from 2-10, and q is an integer selected from 0 to 10, preferably from 0 to 5. Exemplary structures according to this embodiment are provided below:

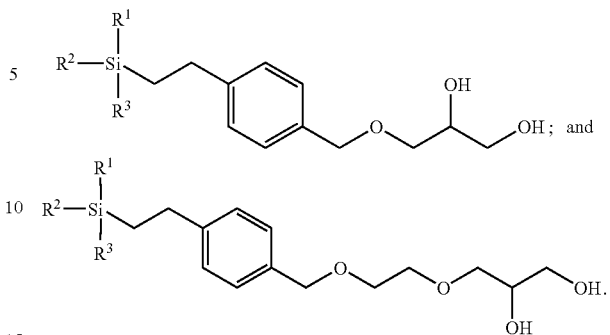

In yet another exemplary embodiment, in Formula (I), n is 0 and $L^2$ is straight or branched alkyl. In one example according to this embodiment, $L^2$ is alkyl-substituted or unsubstituted $C_5$-$C_{30}$ alkyl, preferably unsubstituted $C_6$-$C_{25}$ alkyl, and more preferably unsubstituted $C_6$-$C_{20}$ alkyl. In a particularly preferred embodiment $L^2$ is $C_6$, $C_7$, $C_8$, $C_9$, $C_{10}$, $C_{11}$, $C_{12}$, $C_{13}$, $C_{14}$ or $C_{15}$ unsubstituted alkyl. An exemplary structure according to this embodiment is provided below:

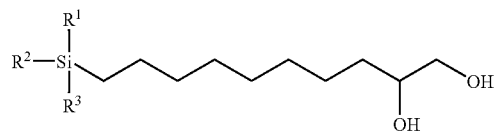

In a further exemplary embodiment, in Formula (I), n is 1 and $L^2$ is straight or branched alkyl. In one example according to this embodiment, $L^2$ is alkyl-substituted or unsubstituted $C_5$-$C_{30}$ alkyl, preferably unsubstituted $C_6$-$C_{25}$ alkyl, and more preferably unsubstituted $C_6$-$C_{20}$ alkyl. In a particularly preferred embodiment $L^2$ is $C_6$, $C_7$, $C_9$, $C_9$, $C_{10}$, $C_{11}$, $C_{12}$, $C_{13}$, $C_{14}$ or $C_{15}$ unsubstituted alkyl. An exemplary structure according to this embodiment is provided below:

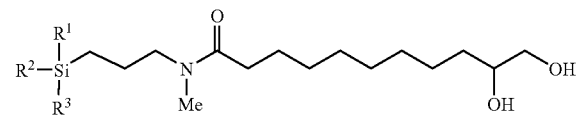

In a particularly preferred embodiment, at least one of $R^1$, $R^2$ and $R^3$ in Formula (I) is $OR^{10}$ wherein $R^{10}$ represents a bond to the substrate (e.g., silica gel). Exemplary compositions of the invention have a structure according to Formula (V):

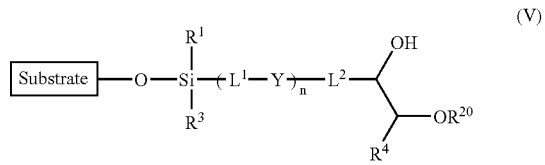

(V)

wherein n is an integer selected from 0 and 1 and $R^1$, $R^3$, $R^4$, $R^{20}$, $L^1$, $L^2$ and Y as well as the substrate are defined as above for Formula (I).

In one embodiment at least one of $R^1$ and $R^3$ in Formula (V) is a non-reactive silyl group substituent. In an exemplary embodiment, at least one of $R^1$ and $R^3$ is a member selected from substituted or unsubstituted alkyl. In one example, at least one of $R^1$ and $R^3$ is unsubstituted $C_1$-$C_6$ alkyl (e.g., methyl, ethyl, n-propyl, iso-propyl, n-butyl, iso-butyl and the like). In another example, both $R^1$ and $R^3$ are members independently selected from substituted or unsubstituted alkyl, such as unsubstituted $C_1$-$C_6$ alkyl (e.g., methyl, ethyl, n-isopropyl, propyl, iso-propyl, n-butyl, iso-butyl and the like). In a preferred embodiment, at least one of $R^1$ and $R^3$ is methyl. In another preferred embodiment, both $R^1$ and $R^3$ are methyl.

Exemplary compositions according to Formula (V) include:

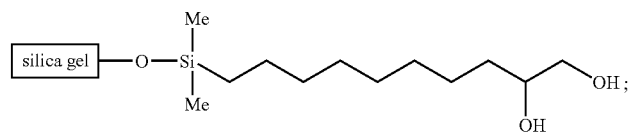

15

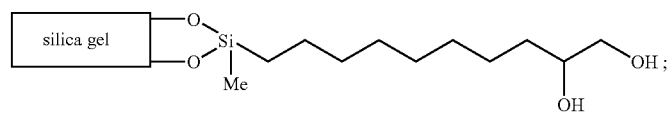

16

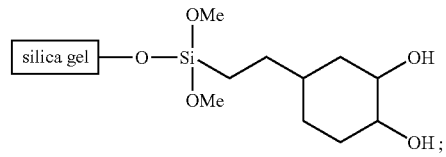

17

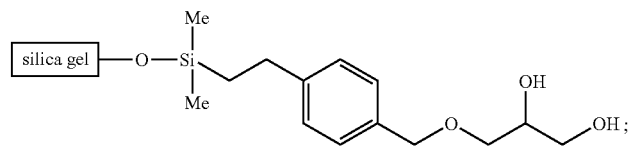

18

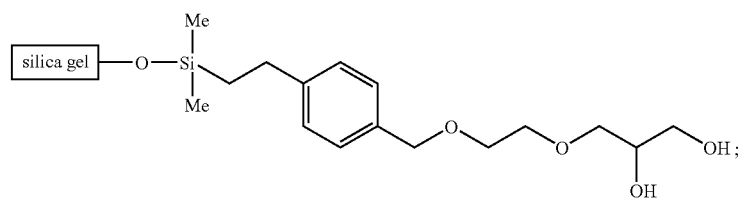

19

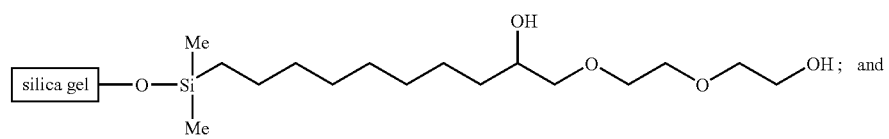

20

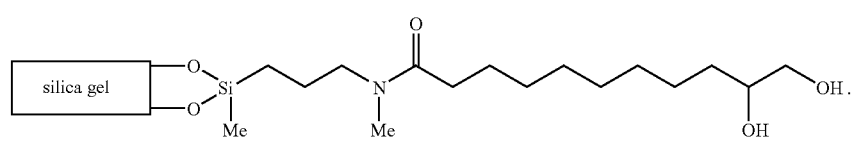

21

Diol phase 15 has been evaluated chromatographically (see Examples 8 to 10). It was found that this material has chromatographic properties different from those of conventional diol phases. The introduction of enhanced hydrophobicity extends the operating range of the new diol phase into reversed-phase conditions (see FIG. 5 and FIG. 6). In addition, the combination of hydrophobic and hydrophilic functionalities provides enhanced resolution for oligomers in ethoxylated molecules, such as alkylphenoethoxylates (IG-EPAL CA-630) (see FIG. 4 and FIG. 6).

The current invention provides embodiment, in which the compositions of the invention are contained in a container. The container is preferably a chromatography column. Exemplary chromatography columns include metal columns, glass columns and columns made from a polymeric material, such as plastics. Metal columns may be those commonly used for chromatography procedures employing high pressure (e.g., HPLC). Plastic columns may be those commonly employed for preparative chromatography systems. Such polymeric columns are frequently disposable and are often referred to as cartridges.

Starting Materials

In a second aspect the invention provides a compound incorporating a reactive silyl group as well as a precursor moiety (which can be converted into a polar head group). Such compounds have the following general formula:

ring creating a cyclic 1,2-diol protecting group, such as a ketal. Exemplary protecting groups for the protection of hydroxyl groups and 1,2-diol groups of Formula (VIb) include those described in Greene W. and Wuts P. G. M., "Protective Groups in Organic Chemistry", (Wiley, 3rd edition 1999), for example pages 17-245. In one example, Z in Formula (VIb) is a substituted methyl group forming a substituted methyl ether, such as a methoxymethyl (MOM) ether.

When n is 1, at least one of $L^1$ and $L^2$ in Formulae (VIa) and (VIb) includes a hydrophobic moiety. When n is 0, $L^2$ includes a hydrophobic moiety. In this context, a "hydrophobic moiety" includes a carbon chain having a preferred number of carbon atoms in sequence, wherein this number is defined by a lower and an upper limit. With respect to the lower limit the "hydrophobic moiety" has preferably at least 5, at least 6, at least 7, at least 8, at least 9, at least 10, at least 11, or at least 12 carbon atoms in sequence. In a particularly preferred embodiment, the hydrophobic moiety has at least 7 carbon atoms in sequence. With respect to the higher limit, the "hydrophobic moiety" includes preferably not more than about 50 carbon atoms in sequence, not more than about 30 carbon atoms, not more than about 25 carbon atoms, not more than about 20 carbon atoms, or not more than about 15 carbon atoms in sequence. Exemplary ranges for the number of carbon atoms in sequence may be formed between the above described higher and lower limits. In yet another embodiment, the hydrophobic moiety includes more than 50 carbon

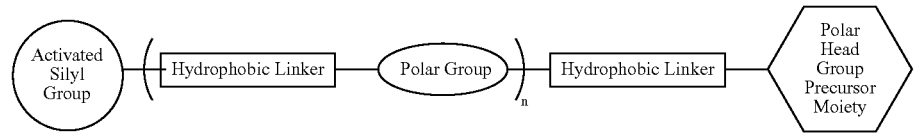

In one embodiment, the compounds incorporate an epoxide moiety or a protected diol moiety. The compounds have a structure according to Formulae (VIa) and (VIb), wherein n is an integer selected from 0 and 1:

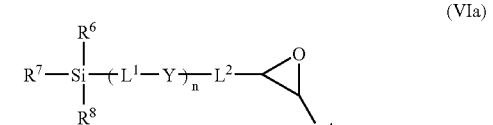
(VIa)

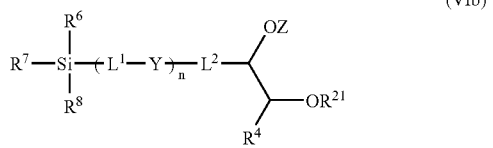
(VIb)

In Formulae (VIa) and (VIb), $L^1$, $L^2$, $R^4$, $R^{20}$ and Y are defined as above for Formula (I). In Formula (VIb), Z is a protecting group and $R^{21}$ is a member selected from a protecting group, substituted alkyl, substituted heteroalkyl and substituted heterocycloalkyl, provided that at least one substituent of $R^{21}$ is a protected hydroxyl group. In one embodiment, $R^{21}$ is a moiety, which is derived from the nucleophilic opening of an epoxide ring using a nucleophilic reagent having a nucleophilic oxygen. In one example, $R^{21}$ includes a polyether moiety. Z and R may optionally be joined to form a atoms in sequence. Within the hydrophobic moiety, at least two of the carbon atoms in sequence are optionally part of a ring (e.g., a 5- or 6-membered ring), wherein the ring is a member selected from aryl, heteroaryl, cycloalkyl and a fused ring system that can include aryl, heteroaryl and cycloalkyl rings. The ring is optionally substituted with a non-polar (hydrophobic) substituent, such as an unsubstituted alkyl group (e.g., methyl, ethyl or propyl group).

In an exemplary embodiment, the compounds of Formulae (VIa) and (VIb) are useful as starting materials in the synthesis of the compositions of the invention.

In Formula (VI), $R^6$, $R^7$ and $R^8$ are silyl group substituents and together with the Si atom form an activated silyl group. An activated silyl group includes at least one reactive silyl group substituent. A reactive silyl group substituent is capable of reacting with a substrate of the invention to form a covalent bond between the compound and the substrate. Thus, at least one of $R^6$, $R^7$ and $R^8$ is a reactive silyl group substituent. Exemplary reactive silyl group substituents include alkoxy groups, halogens and primary or secondary amino groups.

In one embodiment, $R^6$, $R^7$ and $R^8$ are members independently selected from halogen, $OR^{14}$, $NR^{14}R^{15}$, $OC(O)R^6$, $OS(O)_2R^{16}$, acyl, substituted or unsubstituted alkyl, substituted or unsubstituted heteroalkyl, substituted or unsubstituted aryl, substituted or unsubstituted heteroaryl and substituted or unsubstituted heterocycloalkyl. Each $R^{14}$ and each $R^{15}$ is a member independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl. Each $R^{16}$ is a member independently selected from substituted or unsubstituted alkyl, substituted or unsubstituted heteroalkyl, substituted or unsubstituted aryl, substituted or unsubstituted heteroaryl and substituted or unsubstituted heterocycloalkyl. In a preferred embodiment, at least one of $R^6$, $R^7$ and $R^8$ is other than OH, unsubstituted alkyl, unsubstituted aryl, unsubstituted heteroaryl and unsubstituted heterocycloalkyl.

In one example, one of $R^6$, $R^7$ and $R^8$ is a non-reactive silyl group substituent. In another example, two of $R^6$, $R^7$ and $R^8$ are non-reactive silyl group substituents. Exemplary non-reactive silyl group substituents include alkyl groups or aryl groups. In a preferred embodiment, one or two of $R^6$, $R^7$ and $R^8$ are members selected from unsubstituted $C_1$-$C_6$ alkyl (e.g., methyl, ethyl, n-propyl, iso-propyl, n-butyl, iso-butyl and the like). In yet another example, two of $R^6$, $R^7$ and $R^8$ are non-reactive silyl group substituents. For example, two of $R^6$, $R^7$ and $R^8$ are members independently selected from substituted or unsubstituted alkyl, such as substituted or unsubstituted $C_1$-$C_6$ alkyl (e.g., methyl, ethyl, n-propyl, iso-propyl, n-butyl, iso-butyl and the like). In a particularly preferred embodiment, one or two of $R^6$, $R^7$ and $R^8$ are methyl.

Exemplary compounds according to Formulae (VIa) and (VIb) include:

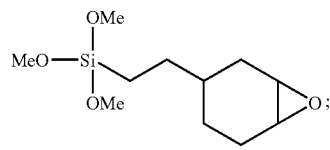

3

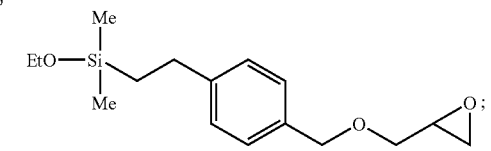

4

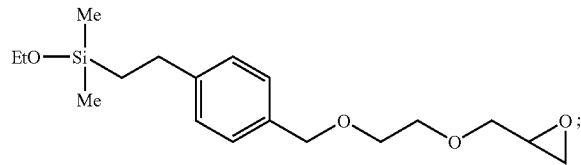

5

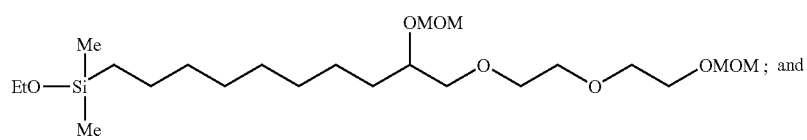

6

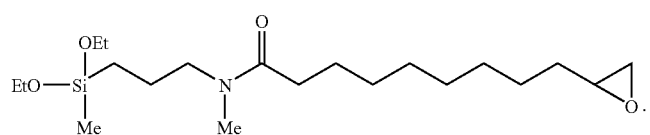

7

IV. Methods

The compositions and compounds of the invention may be synthesized using methods known in the art and those described herein. Exemplary methods are outlined in Schemes 1-3, below and in Examples 1 to 6. Variation of those methods may be necessary to synthesize compounds of certain embodiments. Those alternative methods will be apparent to a person of skill in the art. Starting materials and reagents useful for preparing the compositions and compounds of the invention are commercially available or can be prepared using art-recognized methodologies.

Synthesis of Compounds According to Formula (VI)(Starting Materials)

In one embodiment, compounds of Formula (VIa) are prepared using a procedure outlined in Scheme 1, below, in which the integer t is a member selected from 0 to 30, preferably from 2 to 20 and most preferably from 2 to 15. In Scheme 1, the terminal double bond of compound 30 is hydrosilylated using a silane in the presence of a catalyst, such as a platinum(0) catalyst, to give compound 31.

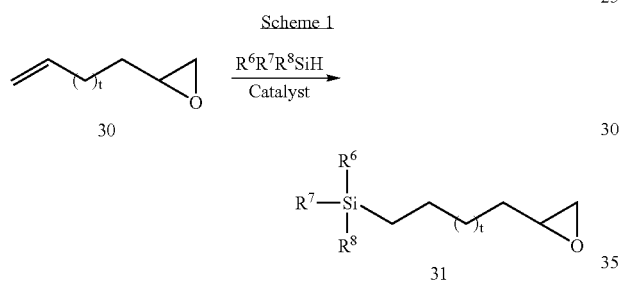

In another example, compounds according to Formula (VIa), in which n is 1, are synthesized following a procedure outlined in Scheme 2, in which the integer t is selected from 0 to 30, preferably from 4 to about 30, and more preferably from 4 to about 20; and the integer u is selected from 0 to about 30, preferably from 1 to about 20. In Scheme 2, compound 32 having an activate carboxylic acid group (e.g., an acid chloride moiety) is reacted with the amine 33 in the presence of a base (e.g., triethylamine) to form the amide 34. Subsequently, the terminal double bond of 34 is oxidized to form an epoxide moiety. Epoxidation reagents are known in the art and include perbenzoic acids, such as meta-chloroperbenzoic acid (m-CPBA). Epoxidation reactions can be performed stereoselectively resulting in chiral products. Chiral epoxides of the invention can be used to synthesize chiral versions of the compositions of the invention useful for chiral chromatography.

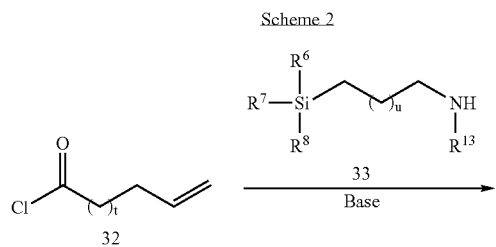

In Scheme 2, $R^{13}$ is a member selected from H, substituted or unsubstituted alkyl, substituted or unsubstituted heteroalkyl, substituted or unsubstituted aryl, substituted or unsubstituted heteroaryl and substituted or unsubstituted heterocycloalkyl. In a preferred embodiment, $R^{13}$ is H or lower alkyl, such as methyl.

Figure 3:
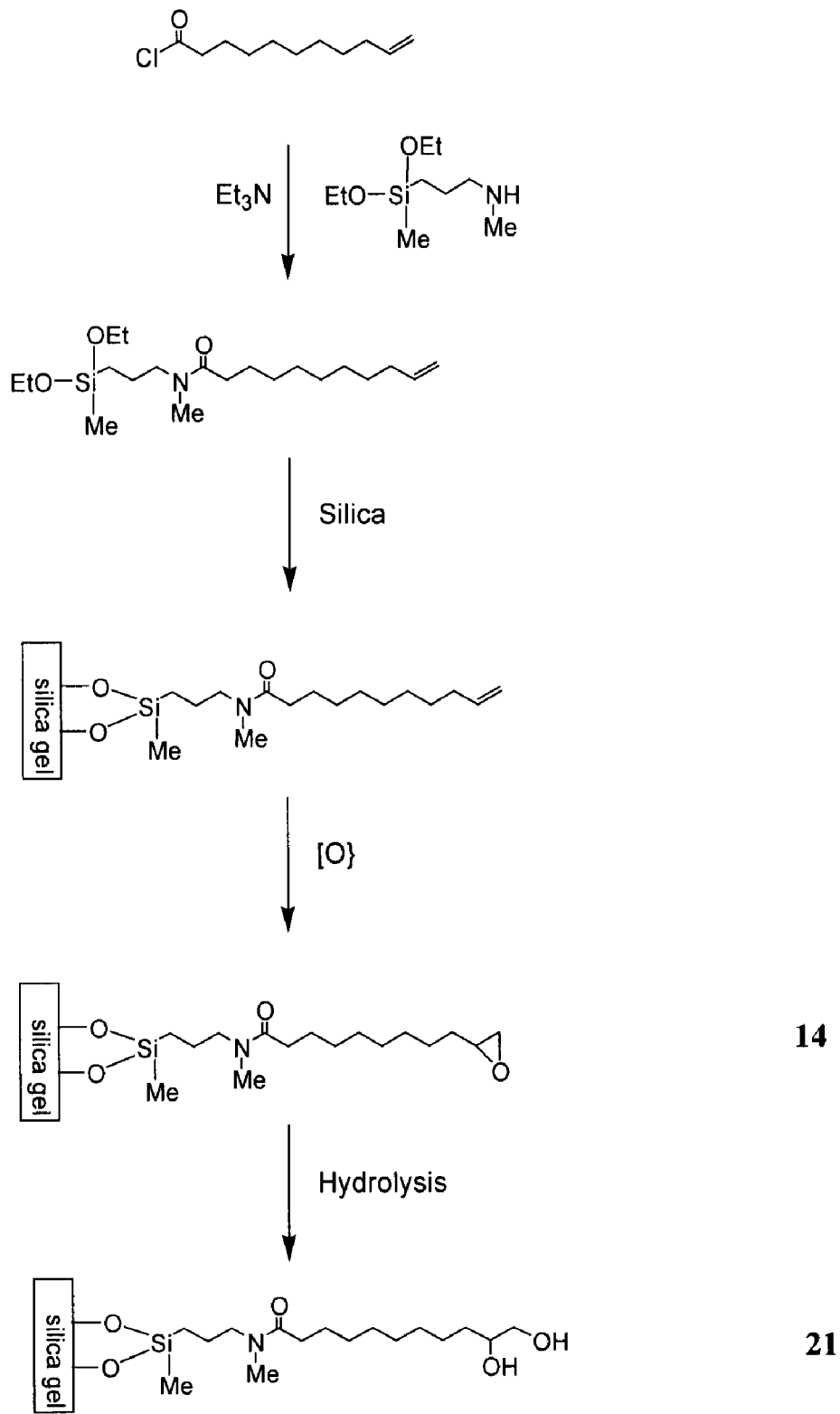
FIG. 3 is a synthetic scheme showing the preparation of diol phase 21.

Alternatively, compound 34 is first coupled to a substrate of the invention as described herein and the double bond is subsequently oxidized to form an epoxide moiety, which may then be converted to a 1,2-diol moiety. An exemplary synthetic strategy according to this embodiment is presented in FIG. 3 outlining a synthetic route to composition 21.

In yet another example, compounds according to Formula (VIb) are synthesized following a procedure outlined in Scheme 3, in which the integer t is a member selected from 0 to 30, preferably from 2 to 20 and most preferably from 2 to 15.

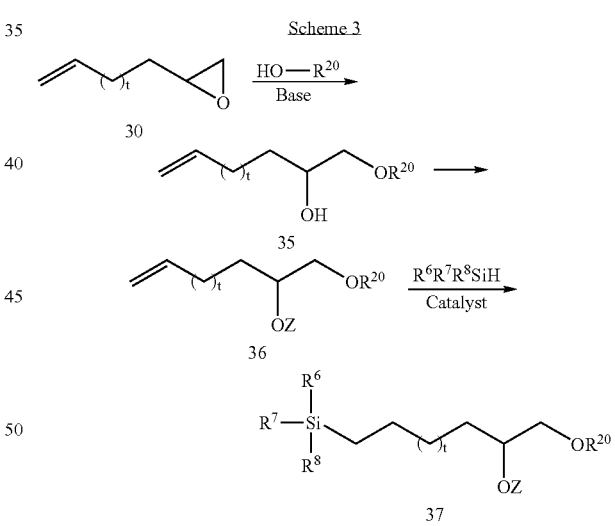

In Scheme 3, the epoxide ring of compound 30 is opened using a nucleophilic reagent. The nucleophile may be formed through reaction of a hydroxyl group-containing starting material with a suitable base, such as NaH. The resulting OH-group of compound 35 may be protected to form compound 36, in which Z is a protecting group. Additional hydroxyl groups of the residue $R^{20}$ may also be protected during this step. Suitable protecting groups, such as substituted methyl ethers (e.g., MOM ether) are discussed herein above in the context of describing Formula (VIb). The fully protected analog 36 is then hydrosilylated as described above in Scheme 1 to form compound 37.

Synthesis of Compounds According to Formula (I)

Compounds of Formula (VIa) and (VIb) can be covalently attached to a substrate (e.g., silica gel) to form a composition of the invention. In one embodiment, a covalent bond between the substrate and the compound is formed through reaction of the substrate with at least one reactive silyl group substituent of the compound. In an exemplary embodiment, the substrate includes reactive functional groups that react with the reactive silyl group substituent to form a covalent bond. Exemplary reactive functional groups of the substrate include silanol and alkoxy silane groups as well as halosilane and aminosilane moieties.

Typically, reaction between a silica substrate and a compound of the invention is effected by heating a mixture of the compound and a slurry of the silica substrate in an inert solvent (e.g., toluene). For example, the mixture is heated to reflux for from about 2 to about 100 hours, preferably from about 10 to about 80 hours, and more preferably from about 10 to about 60 hours. Optionally, a coupling catalyst is added to control the density of the bonded groups on the surface of the substrate as well as the morphology of the resulting phase. Exemplary coupling catalysts include water as well as organic and inorganic acids (e.g., HCl) and bases (NaOH, amines).

The above described coupling procedure results in intermediate compositions incorporating a polar head group precursor moiety, such as an epoxide or a protected 1,2-diol moiety. In one embodiment, the intermediate composition has a structure according to Formulae (VIa) or (VIIb):

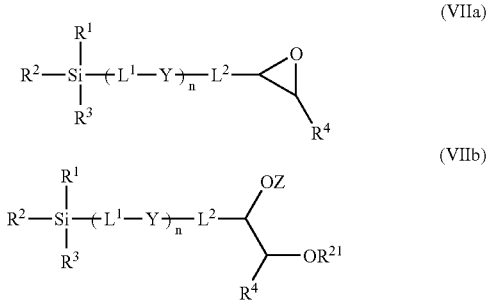

In one example the intermediate compositions have a structure according to Formulae (VIIIa) and (VIIIb):

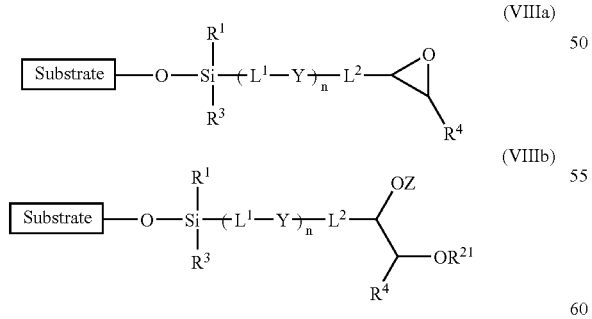

The above intermediate compositions of Formulae (VIIa), (VIIb), (VIIIa) and (VIIb) are expected to be useful as stationary phases in chromatography and are within the scope of the current invention.

The intermediate compositions of the invention may be converted to compositions of the invention, for example those of Formula (I), through conversion of the polar head group precursor to a polar head group, such as a 1,2-diol moiety. In one embodiment, the epoxide moiety of Formula (VIIa) or Formula (VIIIa) is converted to a 1,2-diol moiety. It is well within the abilities of a skilled person to carry out such hydrolysis. For example, acid catalyzed hydrolysis can be carried out by treating the intermediate composition with an aqueous solution containing an organic (e.g., formic acid) or inorganic acid.

In another embodiment, the protected diol moiety of Formulae (VIb) and (VIIb) is deprotected to form a 1,2-diol moiety. The removal of a protecting groups is also well within the abilities of a skilled person. Reaction conditions will depend on the type of protecting group used. Exemplary deprotection procedures include those described in Greene W. and Wuts P. G. M., "Protective Groups in Organic Chemistry", (Wiley, 3rd edition 1999), for example pages 17-245. In one example, Z in Formulae (VIb) and (VIIb) is a substituted methyl group forming a substituted methyl ether, such as a methoxymethyl (MOM) ether. Such ethers may be converted to the corresponding hydroxyl group through acid-catalyzed hydrolysis.

Accordingly, the invention provides methods of making a composition of the invention. In one embodiment, the method includes: (i) contacting a substrate (e.g., silica gel) having a reactive functional group (e.g., a silanol group) with a compound having an epoxide moiety and having a structure according to Formula (VIa):

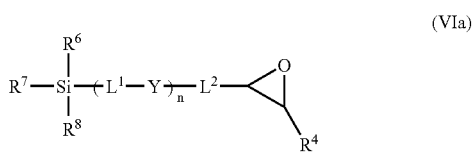

wherein n, $R^6$, $R^7$, $R^8$, $L^1$, $L^2$, $R^4$ and Y are defined herein above for Formula (VIa), under conditions sufficient to form a covalent bond between the compound and the substrate through reaction between the reactive functional group of the substrate and at least one of $R^6$, $R^7$ and $R^8$. The method may further include (ii) converting the epoxide moiety into an 1,2-diol moiety, for example, by acid-catalyzed hydrolysis or by opening of the epoxide ring using a nucleophilic reagent as described above. In a preferred embodiment, at least one of $R^6$, $R^7$ and $R^8$ is halogen or alkoxy (e.g., methoxy or ethoxy).

In another embodiment, the method includes: (i) contacting a substrate (e.g., silica gel) having a reactive functional group (e.g., a silanol group) with a compound having a protected 1,2-diol moiety and having a structure according to Formula (VIb):

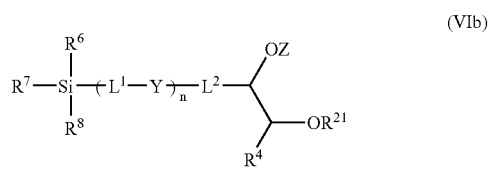

wherein n, $R^6$, $R^7$, $R^8$, $L^1$, $L^2$, $R^4$, $R^{21}$, Z and Y are defined herein above for Formula (VIb), under conditions sufficient to form a covalent bond between the compound and the substrate through reaction between the reactive functional group of the substrate and at least one of $R^6$, $R^7$ and $R^8$. The method may further include (ii) removing the protecting group to form an 1,2-diol moiety, for example, by acid-catalyzed hydrolysis as described above. In a preferred embodiment, at least one of $R^6$, $R^7$ and $R^8$ is halogen or alkoxy (e.g., methoxy or ethoxy).

Chromatographic Methods

In another embodiment, the invention provides a chromatographic method comprising flowing a mobile phase through a stationary phase comprising a composition of the invention, such as those of Formula (I). In one example, the mobile phase is a liquid. In an exemplary embodiment, the mobile phase includes water. The water content of the mobile phase is preferably between about 0.1% v/v and 60% v/v, more preferably between about 1% and about 20% v/v, even more preferably between about 1% and about 10% v/v and most preferably between about 1% and about 5% v/v.

In another embodiment, the invention provides a method of separating analytes in a liquid sample comprising flowing the liquid sample through a stationary phase comprising a composition of the invention. In an exemplary embodiment, the liquid sample includes water. The water content of the liquid sample is preferably between about 0.1% v/v and 60% v/v, more preferably between about 1% and about 20% v/v, even more preferably between about 1% and about 10% v/v and most preferably between about 1% and about 5% v/v.

EXAMPLES

Example 1

Synthesis of Silyl Ligand 1

To a stirred solution of 50 g 1,2-epoxy-9-decene (e.g., Aldrich), 100 g of (EtO)Me$_2$SiH (e.g., Gelest) in 30 mL of toluene in a 1-L round bottom flask at ambient temperature were carefully added 0.5 g of Pt(0) catalyst (0.1% wt) (e.g., Gelest). Occasionally, an exothermic reaction is observed upon addition of the catalyst. The flask was equipped with a condenser and the reaction mixture was heated to 50° C. for 8 h. The reaction was monitored using gas chromatography.

When the conversion was found to be higher than 60% by GC, all volatiles were removed in vacuo. Residual volatiles were removed by Kugelrohr Distillation (120° C./0.05 torr).

Example 2

Synthesis of Silyl Ligand 2

To a stirred solution of 50 g 1,2-epoxy-9-decene (e.g., Aldrich), 100 g of (EtO)$_2$MeSiH (e.g., Gelest) in 30 mL of toluene in a 1-L round bottom flask at ambient temperature were carefully added 0.5 g of Pt(0) catalyst (0.1% wt) (e.g., Gelest). Occasionally, an exothermic reaction is observed upon addition of the catalyst. The flask was equipped with a condenser and the reaction mixture was heated to 50° C. for 8 h. The reaction was monitored using gas chromatography.

When the conversion was found to be higher than 60% by GC, all volatiles were removed in vacuo. Residual volatiles were removed by Kugelrohr Distillation (140° C./0.11 torr).

Example 3

Synthesis of Silyl Ligand 6

To 5.89 g (0.24 mol, 1.2 eq) of sodium hydride in an oven-dried four necked 1 L flask equipped with a mechanical stirrer, reflux condenser, additional funnel, internal thermometer and nitrogen inlet, were added 600 mL of anhydrous N,N-dimethylformamide. 127.82 g (1.2 mol, 6 eq) of diethylene glycol were added dropwise in one hour. The mixture was stirred at 75° C. for four hours before 30.3 g of 1,2-epoxy-9-decene (0.2 mol, 1 eq) were added dropwise over 30 minutes. The reaction mixture was stirred at 75° C. overnight and was then cooled to room temperature. The volatiles were removed in vacuo. 300 mL of water were added to the residue. Concentrated HCl was then added until pH 2-3. The product was extracted with methylene chloride (3×250 mL). The organic phase was washed with water (3×250 mL) and brine (2×250 mL) and was dried over MgSO$_4$. The volatiles were removed in vacuo. The residue was subjected to Kugelrohr distillation (145° C./0.03 mmHg) to give 42.90 g of intermediate B in 83% yield (100% purity by GC).

To a solution of 5.20 g of intermediate B (20 mmol, 1 eq.) in 60 mL of 1, 2-dimethoxyethane in a 250 mL three necked flask equipped with a funnel and a nitrogen inlet, were added 8.9 mL of diisopropylethylamine. The mixture was cooled to 0° C. and 3.65 g of methoxylmethyl(MOM) chloride in 10 mL 1,2-dimethoxyethane were added over 30 minutes. The mixture was warmed to room temperature and stirred for 2 days. The mixture was then diluted with 200 mL ether and washed with water (3×75 mL) and brine (3×75 mL). It was dried over magnesium sulfate and the volatiles were removed in vacuo. The crude residue was purified by Kugelrohr distillation (150° C./0.03 mmHg) to give 6.79 g of intermediate C in 98% yield (96.45% purity by GC).

To a stirred mixture of 6.79 g of intermediate C (19.5 mmol, 1 eq.) and 8.0 mL of dimethylethoxyl silane (58.1 mmol, 3 eq.) in a 100 mL flask with condenser were carefully added a solution of 0.08 g of a Pt(0) catalyst (0.1% wt) in 2 mL of toluene (an exothermic reaction is sometimes observed). The mixture was refluxed at 52° C. over night. The volatiles were removed in vacuo and the residue was purified by Kugelrohr distillation (185° C./0.03 mmHg) to give 7.56 g of silyl ligand 6 in 85% yield and 85.6% purity by GC.

Example 4

Synthesis of Silyl Ligand 7

To a stirred solution of N-methylaminopropylmethyldimethoxysilane (180 g, 95%) and triethylamine (140 mL) in anhydrous CH$_2$Cl$_2$ (1000 mL) in a 3-neck 5-L round bottom flask purged with nitrogen at below 5° C. (ice-water bath) was slowly added a solution of 10-undecenoyl chloride (220 g, 95%) in anhydrous CH$_2$Cl$_2$ (500 mL). The reaction mixture was stirred at ambient temperature for 16 to 24 hours. GC was used to monitor the reaction. Upon completion of the reaction, the mixture was filtered and the organic phase was washed with D. I. water and dried over Na$_2$SO$_4$. The volatiles were removed in vacuo to give intermediate A as an orange oily liquid (290 g).

The above intermediate A was oxidized with 3-chloroperbenzoic acid using a literature procedure [Tetrahedron Letter, 849 (1965)] to form silyl ligand 7.

Example 5

General Procedure for Preparing Exemplary Intermediate Phases 8-14

Figure 2:
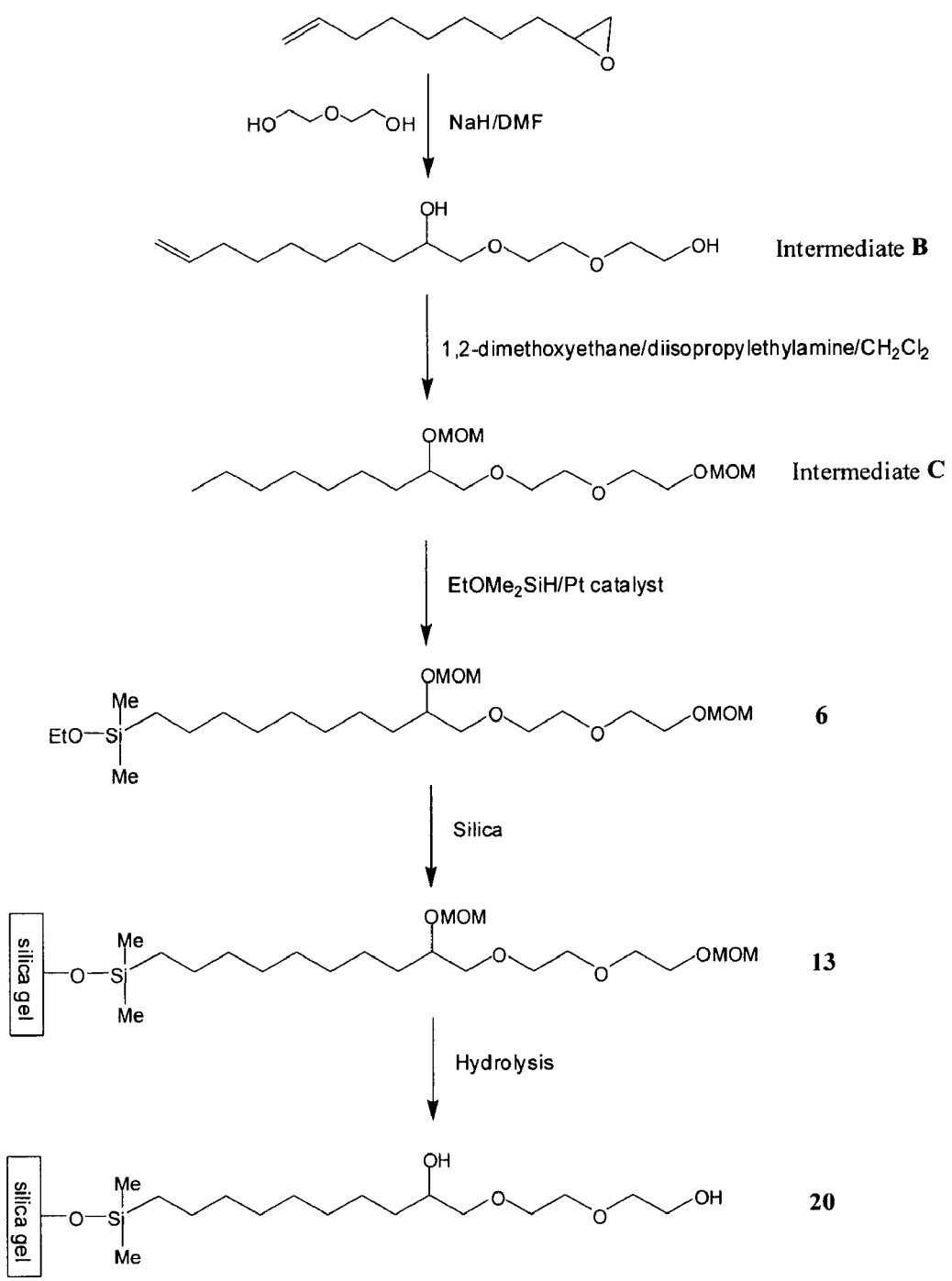
FIG. 2 is a synthetic scheme showing the preparation of diol phase 20.

The coupling reaction between the silica substrate and a compound of the invention having a reactive silyl group were typically carried out in the slurry of the silica gel in an inert solvent such as toluene at elevated temperature. Optionally, water and/or an acid or base catalyst were added to control the surface coverage and morphology of the resulting phase, depending on different application. The reaction mixture was refluxed for 12 to 72 hours. The functionalized silica was then filtered off (e.g., using a glass frit filter) and thoroughly washed with an organic solvent. The solid was dried (e.g., air-dried on the filter) to give bonded silica functionalized with an epoxide moiety or a protected diol moiety (intermediate phases of Formula (VIIa and VIIb)). The preparation of exemplary intermediate phases 8, 13 and 14 are outlined in FIGS. 1, 2 and 3, respectively.

Example 6

General Procedure for Preparing Diol Phases 15-21

25 g of the above bonded silica of Formula (VII) was treated with 0.2% formic acid in an accelerated solvent extraction (ASE) cell (100 mL cell) at 50° C. for 4 hours. The silica was then rinsed thoroughly with acetonitrile and dried in a vacuum oven for 3 hours to give diol phases of Formula (I). The preparation of diol phases 15, 20 and 21 are outlined in FIGS. 1, 2 and 3, respectively.

Example 7

Alternative Procedure for Preparing Diol Phase 21

To a slurry of 25 g of raw silica (5 micron, 120 Å, dried in vacuo at 200° C. for 20 h) in 75 mL of anhydrous m-xylene in a dry 250-mL flask was added a solution of 25 g of silyl intermediate A and the resulting mixture was mixed well (e.g., by shaking and/or sonication). The reaction mixture was refluxed for 120 hours, and the silica was then filtered off and washed with dichloromethane.

The above silica was treated with a solution of 3-chloroperbenzoic acid in dichloromethane at 5° C. and the reaction mixture was stirred for 4 hours. The silica was then filtered off and washed thoroughly with dichloromethane, and then with acetone to give diol phase 21.

Example 8

Comparison Between Diol Phase 15 and a Commercial Diol Packing

Figure 4:
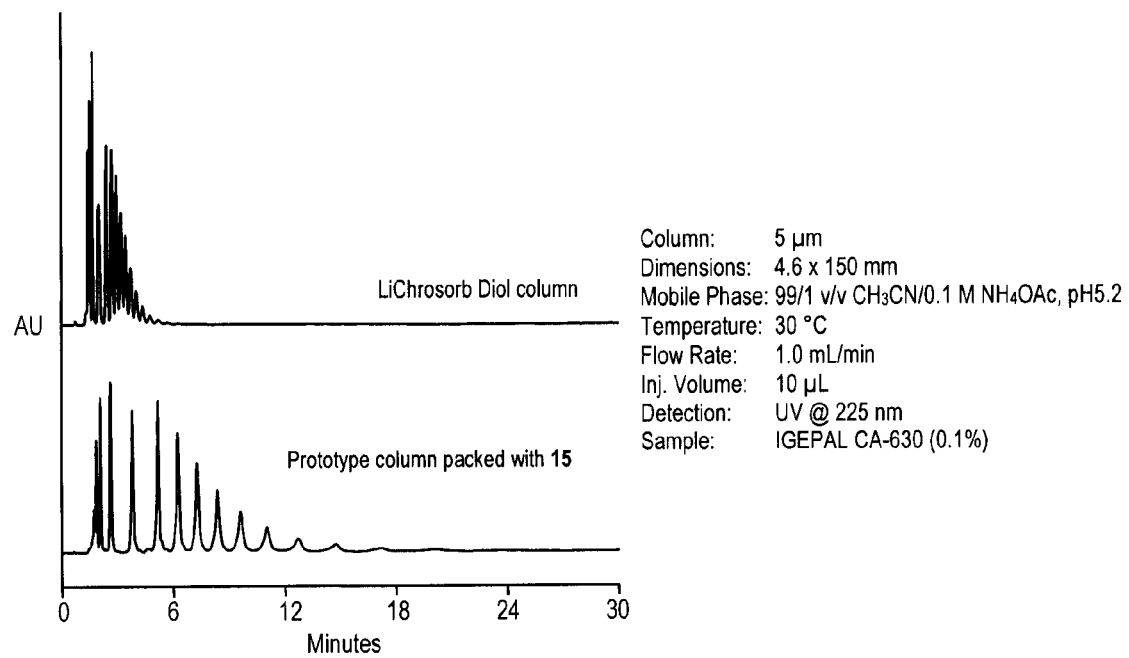
FIG. 4 is a set of two chromatograms comparing the resolution characteristics of diol phase 15 and a commercial diol packing during the analysis of an alkylphenol ethoxylated surfactant (IGPAL CA-630).

Diol phase 15 and a commercial diol packing packing material were compared with respect to their performance during the analysis of an alkylphenol ethoxy surfactant (IGEPAL CA-630). Resulting chromatograms are shown in FIG. 4. Under the same chromatographic conditions, the column packed with 15 exhibits better resolution for oligomers compared to its commercial counterpart. The test conditions were as follows:

| | |
|---|---|
| Column dimensions: | 4.6 × 150 mm with 5 μm particle size |
| Mobile phase: | 99/1 v/v acetonitrile/100 mM ammonium acetate, pH 5.2 |
| Temperature: | 30° C. |
| Flow rate: | 1 mL/min |
| Injection volume: | 10 μL |
| Detection wavelength: | 225 nm |
| Sample: | IGEPAL CA-630 (0.1%). |

Example 9

Figure 5:
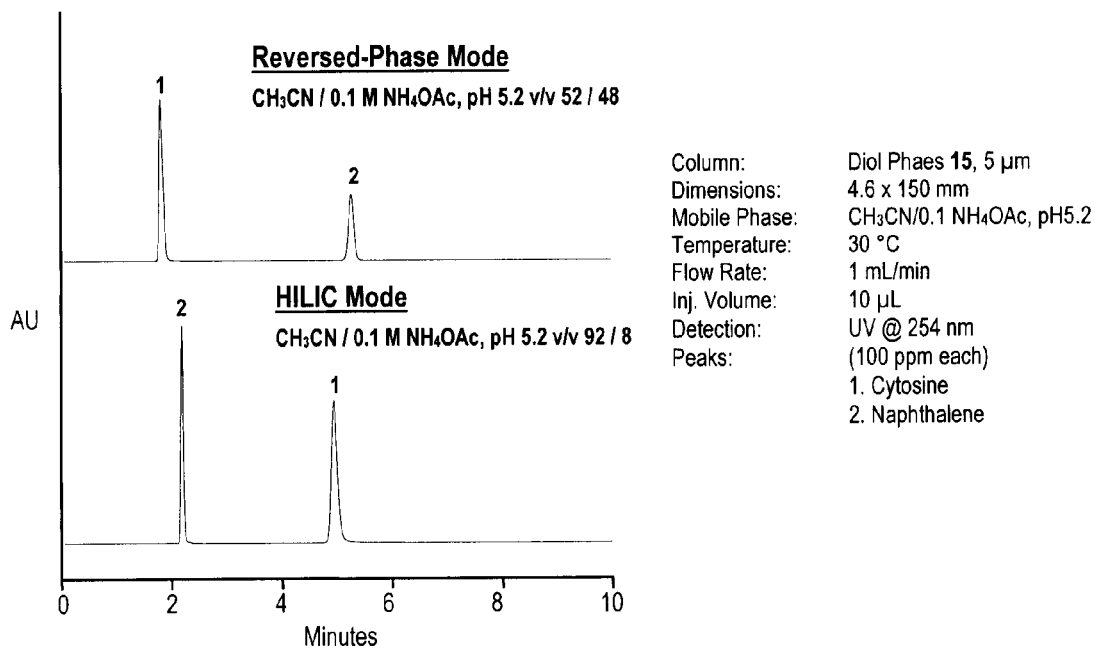
FIG. 5 is a set of two chromatograms comparing the selectivities of diol phase 15 in reversed-phase and normal phase modes. The two analytes are cytosine (1) and naphthalene (2).
Figure 6:
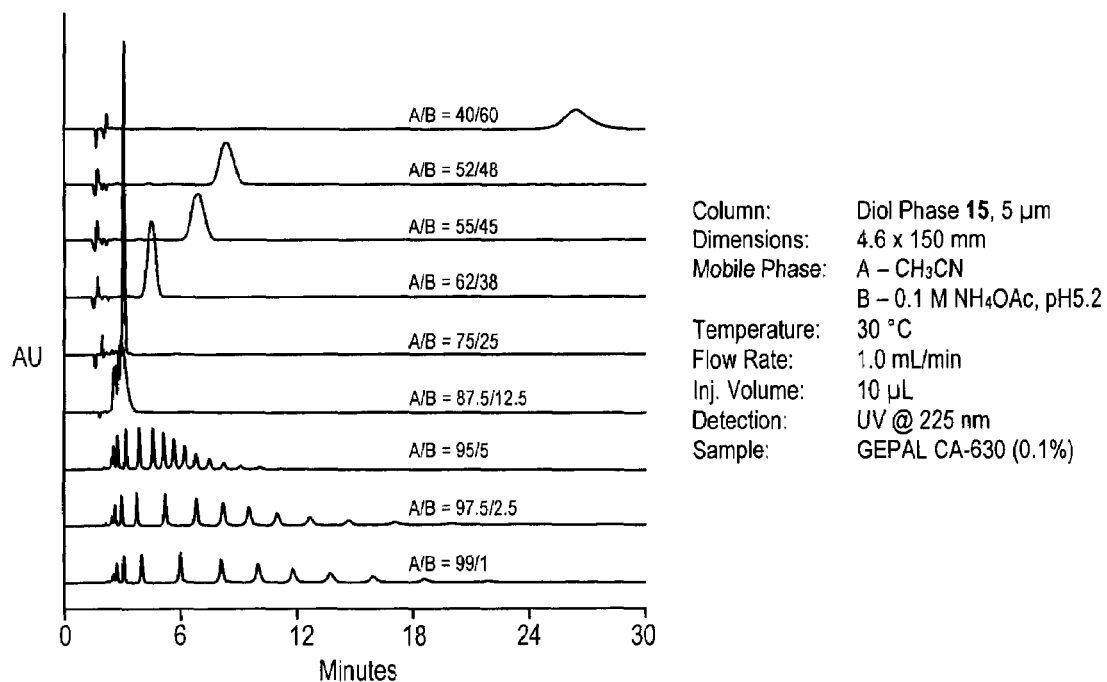
FIG. 6 is a set of 9 chromatograms comparing the resolution characteristics of diol phase 15 during the analysis of an alkylphenol ethoxylated surfactant (IGPAL CA-630) when using mobile phases with varying acetonitrile/buffer ratios.

Selectivity Comparison of Diol Phase 15 in Reversed-Phase and Normal Phase Modes The selectivity of diol phase 15 in both reversed-phase mode and normal phase mode was determined using a polar (cytosine) and non-polar (naphthalene) test analytes. Results are shown in FIG. 5. In reversed-phase mode (mobile phase containing 52% acetonitrile), the polar molecule (cytosine) elutes before the hydrophobic molecule (naphthalene). When the mobile phase contains 92% acetonitrile, diol phase 15 exhibits normal phase behavior, in which retention time increases with polarity of the compound. These results indicate that diol phase 15 can be used for both reversed-phase and normal phase applications. The test conditions were as follows:

| | |
|---|---|
| Column dimensions: | 4.6 × 150 mm with 5 μm particle size |
| Mobile phase: | 52/48 (reversed-phase) or 92/8 (normal phase) v/v acetonitrile/100 mM ammonium acetate, pH 5.2 |
| Temperature: | 30° C. |
| Flow rate: | 1 mL/min |
| Injection volume: | 10 μL |
| Detection wavelength: | 254 nm |
| Sample: | Cytosine (100 ppm) and naphthalene (100 ppm). |

Example 10

Analysis of an Alkylphenyl Ethoxylated Surfactant (IGPAL CA-630) Using Packing Material 15

The surfactant IGEPAL CA-630 was analyzed using a column packed with diol phase 15 and mobile phases containing various amounts of acetonitrile. Results are summarized in FIG. 6. In an aqueous-rich mobile phase, the new packing material behaves like a reversed-phase material, in which retention of an analyte increases when the aqueous content of the mobile phase is high. In organic-rich mobile phases, diol phase 15 acts like a normal phase, in which the retention increases when the organic content of the mobile phase is high. In addition, oligomer resolution is enhanced under normal phase conditions, and diminished under reversed-phase conditions. The test conditions were as follows:

| | |
|---|---|
| Column dimensions: | 4.6 × 150 mm with 5 μm particle size |
| Mobile phase: | 40/60 to 99/1 v/v acetonitrile/100 mM ammonium acetate, pH 5.2 |
| Temperature: | 30° C. |
| Flow rate: | 1 mL/min |
| Injection volume: | 10 μL |
| Detection wavelength: | 225 nm |
| Sample: | IGEPAL CA-630 (0.1%). |

What is claimed is:

1. A composition comprising a compound covalently bound to a substrate, said compound having a structure according to Formula (I):

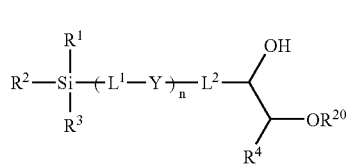

wherein
n is a member selected from 0 and 1;
$R^1$, $R^2$ and $R^3$ are members independently selected from halogen, $OR^{10}$, $NR^{10}R^{11}$, $OC(O)R^{12}$, $OS(O)_2R^{12}$, substituted or unsubstituted alkyl, substituted or unsubstituted heteroalkyl, substituted or unsubstituted aryl, substituted or unsubstituted heteroaryl, substituted or unsubstituted heterocycloalkyl and a bond to said substrate,
wherein
each $R^{10}$ and each $R^{11}$ is a member independently selected from H, substituted or unsubstituted alkyl, substituted or unsubstituted heteroalkyl, substituted or unsubstituted aryl, substituted or unsubstituted heteroaryl, substituted or unsubstituted heterocycloalkyl and a bond to said substrate; and
each $R^{12}$ is a member independently selected from substituted or unsubstituted alkyl, substituted or unsubstituted heteroalkyl, substituted or unsubstituted aryl, substituted or unsubstituted heteroaryl, substituted or unsubstituted heterocycloalkyl,
with the proviso that at least one of $R^1$, $R^2$ and $R^3$ is covalently bound to said substrate;
$L^1$ and $L^2$ are linker groups independently selected from substituted or unsubstituted alkyl, substituted or unsubstituted heteroalkyl, substituted or unsubstituted aryl, substituted or unsubstituted heteroaryl and substituted or unsubstituted heterocycloalkyl,
with the proviso that if n is 1, then at least one of $L^1$ and $L^2$ comprises a carbon chain having at least 8 carbon atoms in sequence, and if n is 0, then $L^2$ comprises a carbon chain having at least 8 carbon atoms in sequence,
wherein at least two of said carbon atoms in sequence are optionally part of a 5- or 6-membered ring, wherein said ring is a member selected from aryl, heteroaryl and cycloalkyl, and wherein said ring is optionally substituted with a non-polar substituent;
$R^4$ is a member selected from H, acyl, substituted or unsubstituted $C_1$-$C_4$ alkyl, substituted or unsubstituted $C_1$-$C_4$ heteroalkyl, wherein $R^4$ and a substituent of $L^2$, together with the atoms to which they are attached, are optionally joined to form a 3- to 7-membered ring;
$R^{20}$ is a member selected from H, substituted alkyl, substituted heteroalkyl and substituted heterocycloalkyl, provided that if $R^{20}$ is not H, at least one substituent of $R^{20}$ is OH; and
Y is a member selected from ether, thioether, amide, sulfonamide, carbonate, carbamate, urea and thiourea.

2. The composition of claim 1, wherein at least one of $R^1$, $R^2$ and $R^3$ is substituted or unsubstituted $C_1$-$C_6$ alkyl.

3. The composition of claim 1, wherein two of $R^1$, $R^2$ and $R^3$ are substituted or unsubstituted $C_1$-$C_6$ alkyl.

4. The composition of claim 3, wherein two of $R^1$, $R^2$ and $R^3$ are methyl.

5. The composition of claim 1, wherein $R^4$ is H.

6. The composition of claim 1, wherein n is 0 and said compound has a structure according to Formula (II):

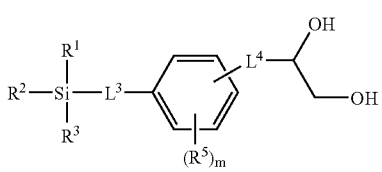

wherein
m is an integer selected from 0 to 4;
$L^3$ is a member selected from substituted or unsubstituted alkyl;
$L^4$ is a member selected from a single bond, substituted or unsubstituted alkyl and substituted or unsubstituted heteroalkyl; and
each $R^5$ is a member independently selected from H, substituted or unsubstituted alkyl and substituted or unsubstituted heteroalkyl, wherein two adjacent $R^5$, together with the atoms to which they are attached, are optionally joined to form a 5- to 7-membered ring.

7. The composition of claim 6, wherein
$R^5$ is a member selected from H and substituted or unsubstituted alkyl;
$L^3$ is unsubstituted alkyl; and
$L^4$ is straight or branched alkyl optionally interrupted by one or more ether or thioether group.

8. The composition of claim 7, wherein said compound has a structure according to Formula (III):

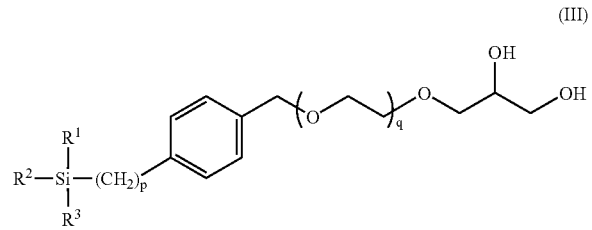

wherein
p is an integer selected from 2 to 10; and
q is an integer selected from 0 to 10.

9. The composition of claim 1, wherein n is O, $R^4$ is H and $L^2$ is substituted or unsubstituted $C_5$-$C_{20}$ alkyl.

10. The composition of claim 9, wherein $L^2$ is unsubstituted $C_6$-$C_{20}$ alkyl.

11. The composition of claim 10, wherein $L^2$ is unsubstituted $C_8$ alkyl.

12. The composition of claim 1, wherein n is 1, Y is an amide group, $R^4$ is H and $L^2$ is substituted or unsubstituted $C_5$-$C_{20}$ alkyl.

13. The composition of claim 12, wherein $L^2$ is unsubstituted $C_6$-$C_{20}$ alkyl.

14. The composition of claim 1, wherein said compound has a structure according to Formula (IV):

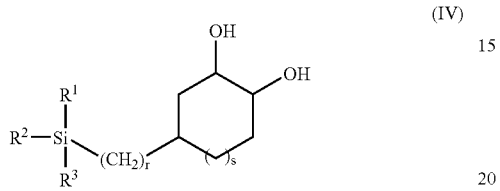

(IV)

wherein r is an integer selected from 2 to 6 and s is an integer selected from 0 and 1, with the proviso that when r is 2, then s is 1.

15. The composition of claim 1 contained in a chromatography column.

16. The composition of claim 15, wherein said chromatography column is a member selected from a metal column and a plastic column.

17. The composition of claim 1, wherein $R^{20}$ is H.

18. The composition of claim 1, wherein said substrate is a member selected from silica gel, sol-gel, a polymer, a polymer/sol-gel hybrid, glass and a silica monolithic material.

19. The composition of claim 1, having a structure according to Formula (V):

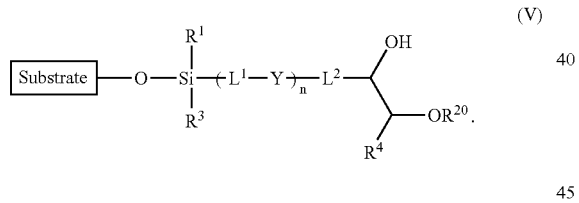

(V)

20. The composition of claim 19, wherein said substrate is a silica-based substrate.

21. The composition of claim 19, wherein at least one of $R^1$ and $R^3$ is substituted or unsubstituted $C_1$-$C_6$ alkyl.

22. The composition of claim 21, wherein at least one of $R^1$ and $R^3$ is methyl.

23. A compound having a structure according to Formula (VIa):

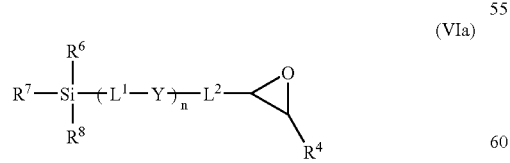

(VIa)

wherein
n is a member selected from 0 and 1;
$R^6$, $R^7$ and $R^8$ are members independently selected from halogen, $OR^{14}$, $NR^{14}R^{15}$, $OC(O)R^{16}$, $OS(O)_2R^{16}$, substituted or unsubstituted alkyl, substituted or unsubstituted heteroalkyl, substituted or unsubstituted aryl, substituted or unsubstituted heteroaryl and substituted or unsubstituted heterocycloalkyl,
wherein
each $R^{14}$ and each $R^{15}$ is a member independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl; and
each $R^{16}$ is a member independently selected from substituted or unsubstituted alkyl, substituted or unsubstituted heteroalkyl, substituted or unsubstituted aryl, substituted or unsubstituted heteroaryl and substituted or unsubstituted heterocycloalkyl,
with the proviso that at least one of $R^6$, $R^7$ and $R^8$ is other than OH, unsubstituted alkyl, unsubstituted aryl, unsubstituted heteroaryl and unsubstituted heterocycloalkyl;
$L^1$ and $L^2$ are linker groups independently selected from substituted or unsubstituted alkyl, substituted or unsubstituted heteroalkyl, substituted or unsubstituted aryl, substituted or unsubstituted heteroaryl and substituted or unsubstituted heterocycloalkyl,
with the proviso that if n is 1, then at least one of $L^1$ and $L^2$ comprises a carbon chain having at least 8 carbon atoms in sequence, and if n is 0, then $L^2$ comprises a carbon chain having at least 8 carbon atoms in sequence,
wherein at least two of said carbon atoms in sequence are optionally part of a 5- or 6-membered ring, wherein said ring is a member selected from aryl, heteroaryl and cycloalkyl; and wherein said ring is optionally substituted with a non-polar substituent;
$R^4$ is a member selected from H, acyl, substituted or unsubstituted $C_1$-$C_4$ alkyl, substituted or unsubstituted $C_1$-$C_4$ heteroalkyl, wherein $R^4$ and a substituent of $L^2$, together with the atoms to which they are attached, are optionally joined to form a 3- to 7-membered ring; and
Y is a member selected from ether, thioether, amide, sulfonamide, carbonate, carbamate, urea and thiourea.

24. A method of making the composition according to claim 1, said method comprising:
(i) contacting a substrate having a reactive functional group with a compound having an epoxide moiety and having a structure according to Formula (VIa):

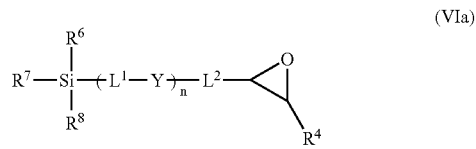

(VIa)

wherein
n is a member selected from 0 and 1;
$R^6$, $R^7$ and $R^8$ are members independently selected from halogen, $OR^{14}$, $NR^{14}R^{15}$, $OC(O)R^{16}$, $OS(O)_2R^{16}$, substituted or unsubstituted alkyl, substituted or unsubstituted heteroalkyl, substituted or unsubstituted aryl, substituted or unsubstituted heteroaryl and substituted or unsubstituted heterocycloalkyl,
wherein
each $R^{14}$ and each $R^{15}$ is a member independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl; and each $R^{16}$ is a member independently selected from substituted or unsubstituted alkyl, substituted or unsubstituted heteroalkyl, substituted or unsubstituted aryl, substituted or unsubstituted heteroaryl and substituted or unsubstituted heterocycloalkyl, with the proviso that at least one of $R^6$, $R^7$ and $R^8$ is other than OH, unsubstituted alkyl, unsubstituted aryl, unsubstituted heteroaryl and unsubstituted heterocycloalkyl;

$L^1$ and $L^2$ are linker groups independently selected from substituted or unsubstituted alkyl, substituted or unsubstituted heteroalkyl, substituted or unsubstituted aryl, substituted or unsubstituted heteroaryl and substituted or unsubstituted heterocycloalkyl, with the proviso that if n is 1, then at least one of $L^1$ and $L^2$ comprises a carbon chain having at least 8 carbon atoms in sequence, and if n is 0, then $L^2$ comprises a carbon chain having at least 8 carbon atoms in sequence, wherein at least two of said carbon atoms in sequence are optionally part of a 5- or 6-membered ring, wherein said ring is a member selected from aryl, heteroaryl and cycloalkyl; and wherein said ring is optionally substituted with a non-polar substituent;

$R^4$ is a member selected from H, acyl, substituted or unsubstituted $C_1$-$C_4$ alkyl, substituted or unsubstituted $C_1$-$C_4$ heteroalkyl, wherein $R^4$ and a substituent of $L^2$, together with the atoms to which they are attached, are optionally joined to form a 3- to 7-membered ring; and Y is a member selected from ether, thioether, amide, sulfonamide, carbonate, carbamate, urea and thiourea, under conditions sufficient to form a covalent bond between said compound and said substrate through reaction between said reactive functional group and at least one of $R^6$, $R^7$ and $R^8$.

25. The method of claim 24 further comprising:

(ii) converting said epoxide moiety into an 1,2-diol moiety.

26. The method of claim 25, wherein said converting of step (ii) is accomplished by acid-catalyzed hydrolysis.

27. The method of claim 25, wherein $R^4$ is H and said converting of step (ii) is accomplished by contacting the product of step (i) and a reagent comprising a nucleophilic oxygen atom.

28. The method of claim 24, wherein said substrate is a silica-based substrate.

29. The method of claim 24, wherein said reactive functional group of said substrate is a member selected from silanol, alkoxysilane, halosilane and aminosilane.

30. The method of claim 24, wherein at least one of $R^1$, $R^2$ and $R^3$ is alkoxy.

31. The composition of claim 1, wherein said substrate is a silica-based substrate.

* * * * *

UNITED STATES PATENT AND TRADEMARK OFFICE
CERTIFICATE OF CORRECTION

PATENT NO. : 7,557,232 B2  Page 1 of 1
APPLICATION NO. : 11/753934
DATED : July 7, 2009
INVENTOR(S) : Xiaodong Liu et al.

It is certified that error appears in the above-identified patent and that said Letters Patent is hereby corrected as shown below:

In Col. 8, line 27, change "-SiR'R"OR'"," to -- -SiR'R"R'",--.

In Col. 15, line 34, change "Each R is" to --Each $R^5$ is--.

In Col. 20, line 61, change "OC(O)$R^6$" to --OC(O)$R^{16}$--.

In Col. 25, line 29, change "Formulae (VIa)" to --Formulae (VIIa)--.

In Col. 25, line 63, change "(VIIb)" to --(VIIIb)--.

In Col. 26, line 11, change "(VIb) and (VIIb)" to --(VIIb) and (VIIIb)--.

In Col. 26, line 18, change "(VIb) and (VIIb)" to --(VIIb) and (VIIIb)--.

Signed and Sealed this

Fourteenth Day of December, 2010

David J. Kappos
*Director of the United States Patent and Trademark Office*